(12) United States Patent
Yachide

(10) Patent No.: US 9,116,751 B2
(45) Date of Patent: Aug. 25, 2015

(54) RECONFIGURABLE DEVICE, PROCESSING ASSIGNMENT METHOD, PROCESSING ARRANGEMENT METHOD, INFORMATION PROCESSING APPARATUS, AND CONTROL METHOD THEREFOR

(75) Inventor: Yusuke Yachide, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 525 days.

(21) Appl. No.: 13/354,735

(22) Filed: Jan. 20, 2012

(65) Prior Publication Data

US 2012/0204181 A1    Aug. 9, 2012

(30) Foreign Application Priority Data

| Feb. 8, 2011 | (JP) | 2011-025284 |
| Feb. 16, 2011 | (JP) | 2011-031220 |
| May 30, 2011 | (JP) | 2011-120990 |
| Jan. 11, 2012 | (JP) | 2012-003035 |
| Jan. 11, 2012 | (JP) | 2012-003497 |

(51) Int. Cl.
  *G06F 17/50* (2006.01)
  *G06F 9/50* (2006.01)

(52) U.S. Cl.
  CPC ........ *G06F 9/5066* (2013.01); *G06F 2209/502* (2013.01)

(58) Field of Classification Search
  CPC ................ G06F 9/5066; G06F 2209/502
  USPC .......................................... 716/116, 117, 139
  See application file for complete search history.

(56) References Cited

U.S. PATENT DOCUMENTS

| 5,946,219 | A | 8/1999 | Mason et al. .................. 716/117 |
| 6,219,833 | B1 | 4/2001 | Solomon et al. |
| 7,551,001 | B2 | 6/2009 | Tetsukawa et al. ............. 326/93 |
| 8,527,949 | B1* | 9/2013 | Pleis et al. ..................... 717/121 |
| 8,635,571 | B1* | 1/2014 | Goldman ....................... 716/117 |
| 2001/0010074 | A1* | 7/2001 | Nishihara et al. ............. 712/227 |
| 2006/0048113 | A1* | 3/2006 | Ozone et al. .................. 717/144 |
| 2009/0319754 | A1 | 12/2009 | Toi et al. .......................... 712/15 |
| 2010/0017761 | A1* | 1/2010 | Higuchi et al. ................... 716/3 |

(Continued)

FOREIGN PATENT DOCUMENTS

| CN | A 1241275 | 1/2000 |
| CN | A 101053158 | 10/2007 |

(Continued)

OTHER PUBLICATIONS

"Difference-Based Partial Reconfiguration", by Emi Eto, Dec. 3, 2007.*

(Continued)

*Primary Examiner* — Nha Nguyen
(74) *Attorney, Agent, or Firm* — Fitzpatrick, Cella, Harper & Scinto

(57) ABSTRACT

According to the present invention, in changing the circuit configuration of a reconfigurable device, a circuit configuration change period is shortened while avoiding a dependency on processing contents without increasing the size of a circuit due to addition of a mechanism. Considering an execution order relation between a plurality of data flows, a setting change count necessary for changing the circuit configuration in changing processing is decreased within a constraint range, thereby shortening the circuit configuration change period.

12 Claims, 24 Drawing Sheets

(56) References Cited

U.S. PATENT DOCUMENTS

| | | | |
|---|---|---|---|
| 2010/0023736 A1* | 1/2010 | Morimoto et al. | 712/227 |
| 2010/0117680 A1* | 5/2010 | Fujita | 326/38 |
| 2011/0099527 A1* | 4/2011 | Courchesne et al. | 716/100 |
| 2011/0225415 A1* | 9/2011 | Yamada et al. | 713/100 |
| 2012/0131257 A1* | 5/2012 | Rudosky et al. | 711/5 |

FOREIGN PATENT DOCUMENTS

| | | |
|---|---|---|
| JP | 11-249904 | 9/1999 |
| JP | B 3558119 | 8/2004 |

OTHER PUBLICATIONS

Office Action issued on Aug. 4, 2014, in counterpart Chinese (P.R.C.) patent application 201210027897.8, with translation.

N. Shirazi et al., "Automating Production of Run-Time Reconfigurable Designs", *Proceedings of IEEE Symposium on FPGAs for Custom Computing Machines 1998*, IEEE, Apr. 15, 1998, pp. 147-156.

\* cited by examiner

F I G. 3
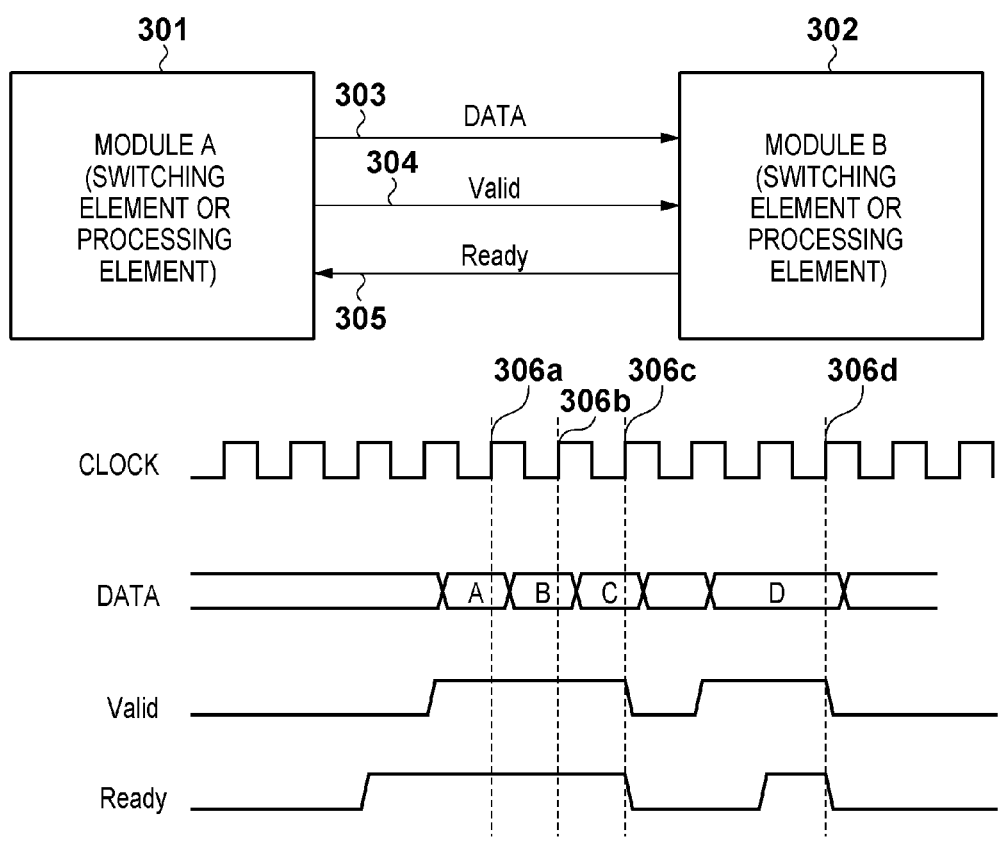

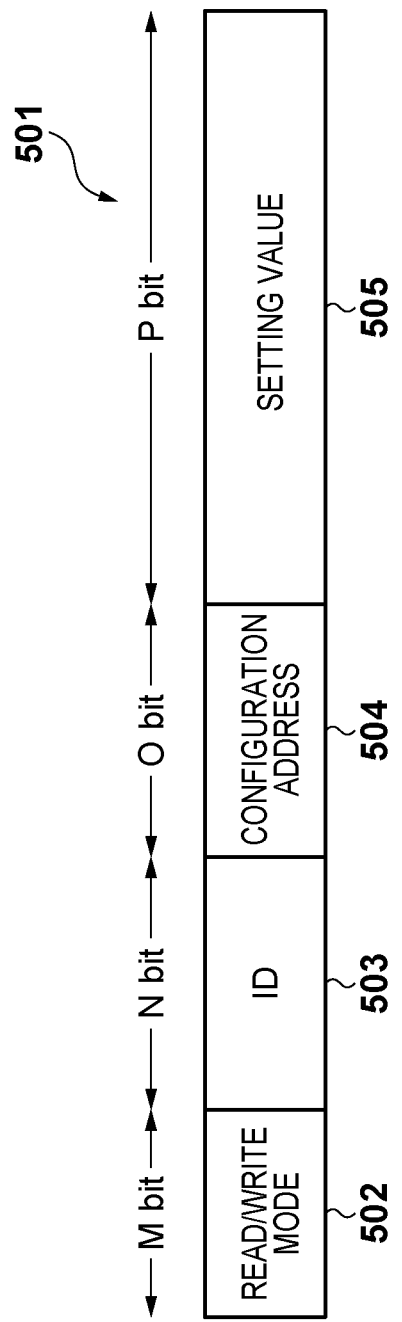

FIG. 6

| 601 | P-1bit      602      0 |
|---|---|
| 0x0000_0000 | INPUT SELECT VALUE |
| 0x0000_0004 | ITERATION NUMBER |
| 0x0000_0008 | OPERATING SETTING (FIRST COMPUTATION) |
| 0x0000_000c | VARIABLE SETTING "a" (FIRST COMPUTATION) |
| 0x0000_0010 | VARIABLE SETTING "b" (FIRST COMPUTATION) |
| 0x0000_0014 | VARIABLE SETTING "c" (FIRST COMPUTATION) |
| 0x0000_0018 | VARIABLE SETTING "d" (FIRST COMPUTATION) |
| 0x0000_001c | PARAMETER "a" (FIRST COMPUTATION) |
| 0x0000_0020 | PARAMETER "b" (FIRST COMPUTATION) |
| 0x0000_0024 | PARAMETER "c" (FIRST COMPUTATION) |
| 0x0000_0028 | PARAMETER "d" (FIRST COMPUTATION) |
| ⋮ | ⋮ |
| 0x0000_0074 | OPERATING SETTING (FOURTH COMPUTATION) |
| 0x0000_0078 | VARIABLE SETTING "a" (FOURTH COMPUTATION) |
| 0x0000_007c | VARIABLE SETTING "b" (FOURTH COMPUTATION) |
| 0x0000_0080 | VARIABLE SETTING "c" (FOURTH COMPUTATION) |
| 0x0000_0084 | VARIABLE SETTING "d" (FOURTH COMPUTATION) |
| 0x0000_0088 | PARAMETER "a" (FOURTH COMPUTATION) |
| 0x0000_008c | PARAMETER "b" (FOURTH COMPUTATION) |
| 0x0000_0090 | PARAMETER "c" (FOURTH COMPUTATION) |
| 0x0000_0094 | PARAMETER "d" (FOURTH COMPUTATION) |
| 0x0000_0098 | OUTPUT SELECT VALUE |

| | P-1bit | 902 | 0 |
|---|---|---|---|
| 901 | | | |
| 0x0000_0000 | CONNECTION SETTING (203a-w) | | |
| 0x0000_0004 | CONNECTION SETTING (203a-s) | | |
| 0x0000_0008 | CONNECTION SETTING (203b-e) | | |
| 0x0000_000c | CONNECTION SETTING (203b-n) | | |
| 0x0000_0010 | CONNECTION SETTING (204b-ne) | | |
| 0x0000_0014 | CONNECTION SETTING (204b-se) | | |
| 0x0000_0018 | CONNECTION SETTING (204b-sw) | | |
| 0x0000_001c | CONNECTION SETTING (204b-nw) | | |

RECONFIGURABLE DEVICE, PROCESSING ASSIGNMENT METHOD, PROCESSING ARRANGEMENT METHOD, INFORMATION PROCESSING APPARATUS, AND CONTROL METHOD THEREFOR

BACKGROUND OF THE INVENTION

1. Field of the Invention

The present invention relates to a reconfigurable device, a processing assignment method, a processing arrangement method, an information processing apparatus and a control method therefor.

2. Description of the Related Art

There is conventionally proposed a reconfigurable device including even a manufactured LSI circuit apparatus which can change processing contents executed by the circuit by changing an internal circuit configuration. Since it is possible to change the processing of even a manufactured LSI circuit apparatus, there is no need to remanufacture an LSI along with a change in specifications. Such reconfigurable device is currently used in various fields because it is possible to reduce the manufacturing cost or to shorten the development period.

A representative reconfigurable device is mounted with a number of LUTs (Look-Up-Tables) or a number of processing elements. Each element is connected with a switching element such as a multiplexer. Note that settings for operating each structure element such as an LUT, processing element, or switching element are collectively called circuit configuration information. Although there are various methods of generating circuit configuration information, in general, many of them sequentially execute (1) a step of logically assigning processes, which is called technology mapping, (2) a step of physically arranging the processes in respective structure elements, and (3) a step of routing respective structure elements. By executing the three steps, circuit configuration information is finally generated.

In the logical processing assignment step of (1), processes are assigned to structure elements. More specifically, each process is assigned to a logical structure element without specifying a physical structure element. As an index for a sequence change operation, the area of a circuit, an operation speed, or power consumption is generally used. In the arrangement step of (2), a physical assignment, that is, a structure element within the reconfigurable device, which executes each process is determined. Depending on the distance between processing elements where processes having a data input/output relation are arranged, a delay time (maximum operating frequency) significantly changes since the number of switching elements involved in data communication changes. In terms of shortening a delay time, it is generally important to arrange processes having an input/output relation in processing elements which are as close as possible to each other. In the routing step of (3), a route is determined by a switching element for data communication between processing elements having a data communication input/output relation. Since detailed routing is performed as compared with the arrangement step, it is important to determine a route so as to shorten a delay time between the processing elements.

In recent years, along with an improvement in the degree of integration, the scale of processing executable in a reconfigurable device has increased. In addition, requirements on processing itself have become complicated and sophisticated, and therefore, it may be difficult to execute all processes in one reconfigurable device at once. To deal with this problem, there is a method of time-divisionally and sequentially executing processes in one reconfigurable device. More specifically, desired processing is divided, and circuit configuration information corresponding to the divided processes is generated. After that, based on the circuit configuration information, changing operations of the circuit configuration of the reconfigurable device and processes are sequentially executed. This enables to execute large-scale processing in a reconfigurable device. If the circuit configuration is changed every time however, the total processing time is prolonged, thereby deteriorating the speed performance. When the number of divided processes is large, this also causes deterioration of the processing speed.

As a method of solving this problem, there is a multicontext reconfigurable device. A context indicates circuit configuration information, and the multicontext reconfigurable device indicates a reconfigurable device mounted with a memory for storing a plurality of pieces of circuit configuration information. When changing the circuit configuration, it is possible to reconstruct the device by switching the memory, and high-speed switching is possible, thereby significantly shortening the reconstruction time of the circuit. Since it is necessary to mount an additional memory for circuit configuration information, however, the size of the circuit becomes large.

To deal with this problem, Japanese Patent No. 3558119 proposes a method based on a skeleton circuit technique as a method of shortening the reconstruction time. In this method, circuit configuration information called a priority-based circuit is generated in a reconfigurable device in advance. Note that the priority-based circuit indicates circuit configuration information including a common circuit portion common to all of a plurality of pieces of circuit configuration information and a nonexclusive independent circuit portion which is not common to a plurality of circuits and does not share circuit configuration information on the reconfigurable device. By partially reconstructing only a difference of a circuit on the reconfigurable device, a circuit necessary for processing is constructed. As compared with a multicontext type, this method does not increase the circuit size since an additional memory for an arrangement is not needed.

A reconfigurable device may generally execute various kinds of applications, and a common portion is small depending on the applications. The number of pieces of circuit configuration information to be reconstructed changes depending on the applications. In priority-based circuit generation described in Japanese Patent No. 3558119, if a common portion is small, or the number of pieces of circuit configuration information is large and the circuit size of the reconfigurable device is significantly exceeded, it is difficult to efficiently shorten a period for changing the circuit configuration.

SUMMARY OF THE INVENTION

The present invention has been made in consideration of the above problems, and provides a reconfigurable device, a processing assignment method, a processing arrangement method, an information processing apparatus and a control method therefor to efficiently shorten the circuit change period without increasing a circuit size by considering a circuit configuration change sequence.

According to first aspect of the invention, there is provided a processing assignment method of assigning a process to a structure element for a reconfigurable device including a plurality of structure elements, the method comprising: a data flow input step of inputting at least two different data flows and an execution order of the data flows; a constraint step of inputting a constraint of the structure element; and a processing assignment determination step of determining a processing assignment so that a setting change count necessary for reconstructing the structure element based on the constraint of the structure element and the execution order becomes small.

According to second aspect of the invention, there is provided a reconfigurable device for assigning a process to a structure element for a reconfigurable device including a plurality of structure elements, the device comprising: a data flow input unit which inputs at least two different data flows and an execution order of the data flows; a constraint input unit which inputs a constraint of the structure element; and a processing assignment determination unit which determines a processing assignment so that a setting change count necessary for reconstructing the structure element based on the constraint of the structure element and the execution order becomes small.

According to third aspect of the invention, there is provided an information processing apparatus including a plurality of structure elements to which processes for implementing a data flow are assignable, the apparatus comprising: an input unit which inputs setting information for implementing a first data flow by the plurality of structure elements, and configuration information of the plurality of structure elements; and a controller which assigns processes for implementing the first data flow to the plurality of structure elements based on the setting information and the configuration information so that the number of structure elements to be changed for settings for implementing a second data flow becomes small.

According to fourth aspect of the invention, there is provided a control method for an information processing apparatus comprising an input unit, a controller, and a plurality of structure elements to which processes for implementing a data flow are assignable, the method comprising: an input step of inputting setting information for implementing a first data flow by the plurality of structure elements, and configuration information of the plurality of structure elements; and a control step of assigning processes for implementing the first data flow to the plurality of structure elements based on the setting information and the configuration information so that the number of structure elements to be changed for settings for implementing a second data flow becomes small.

According to fifth aspect of the invention, there is provided a processing arrangement method for determining a structure element which executes each process of a data flow for a reconfigureable device including a plurality of structure elements, the method comprising: an input step of inputting at least two different data flows and a processing sequence of the data flows; a constraint step of inputting a constraint of the structure element of the reconfigureable device; and a determination step of determining a structure element to execute a requested process by determining an arrangement of the structure elements using a setting change count necessary for reconstruction according to the data flow and a distance between the structure elements based on a dependency relation of data input/output of the data flow.

According to sixth aspect of the invention, there is provided a reconfigurable device which operates based on setting information generated by a processing arrangement method according to the fifth aspect of the invention.

According to the present invention, it is possible to shorten the reconstruction period of a reconfigurable device without increasing the circuit size by generating circuit configuration information so as to decrease the number of settings necessary for reconstruction.

Further features of the present invention will become apparent from the following description of exemplary embodiments (with reference to the attached drawings).

BRIEF DESCRIPTION OF THE DRAWINGS

FIG. 3 is a view showing an example of a data communication procedure between elements of the reconfigurable device;

FIG. 5 is a view showing an example of the format of a configuration command;

FIG. 6 is a view showing an overview of settings stored in the configuration memory of the processing element;

DESCRIPTION OF THE EMBODIMENTS

Preferred embodiments to which the present invention is applied will be described in detail below with reference to the accompanying drawings.

Figure 1:
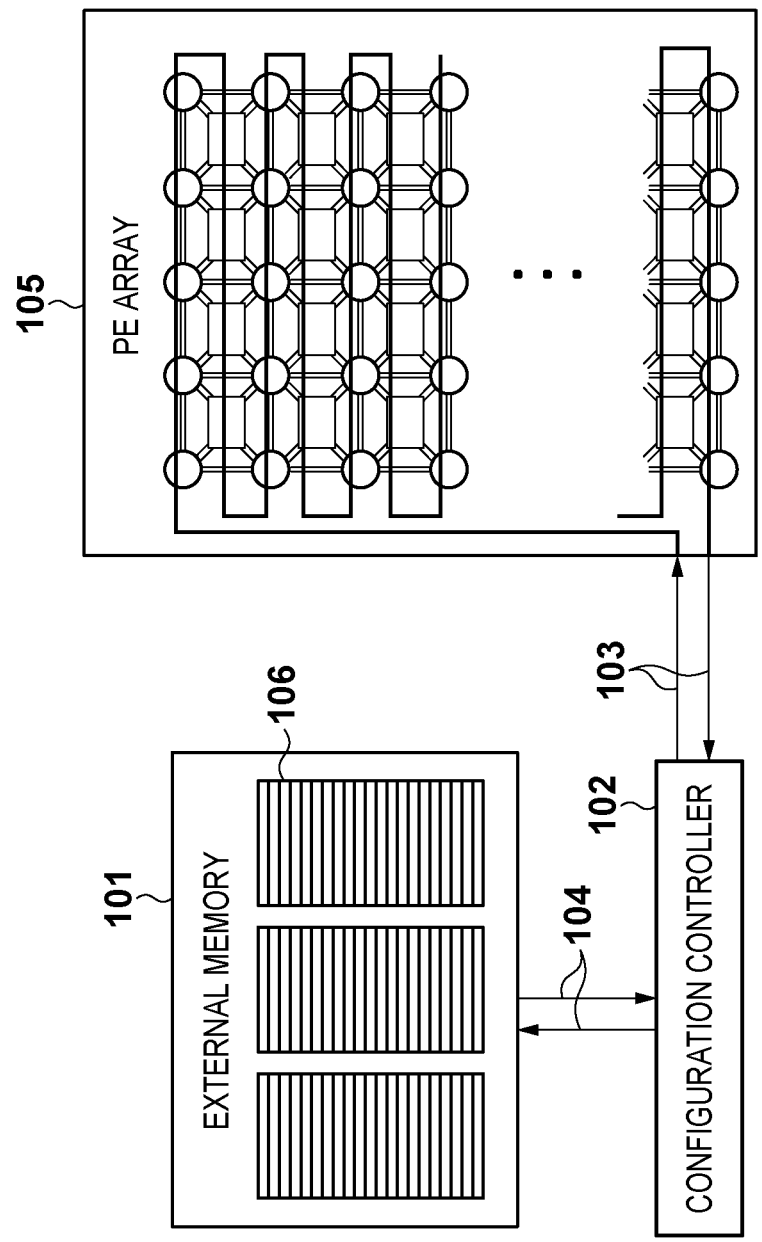
FIG. 1 is a view showing an example of the configuration of a processing apparatus including a reconfigurable device.

FIG. 1 is a view showing an example of the overall configuration of a system having a reconfigurable device according to an embodiment of the present invention. An external memory 101 holds circuit configuration information 106 in itself. The circuit configuration information 106 includes a set of settings for operating the elements of a reconfigurable device 105. A configuration controller 102 acquires the circuit configuration information 106 from the memory 101 through a connection 104. The acquired circuit configuration information 106 is sent to the reconfigurable device 105 through a connection 103. Note that a processing element array is shown as an example of the reconfigurable device 105.

The interior of the processing element array will be described in detail below. The present invention, however, is not limited to the following configuration of each processing element or the following route configuration.

Figure 2:
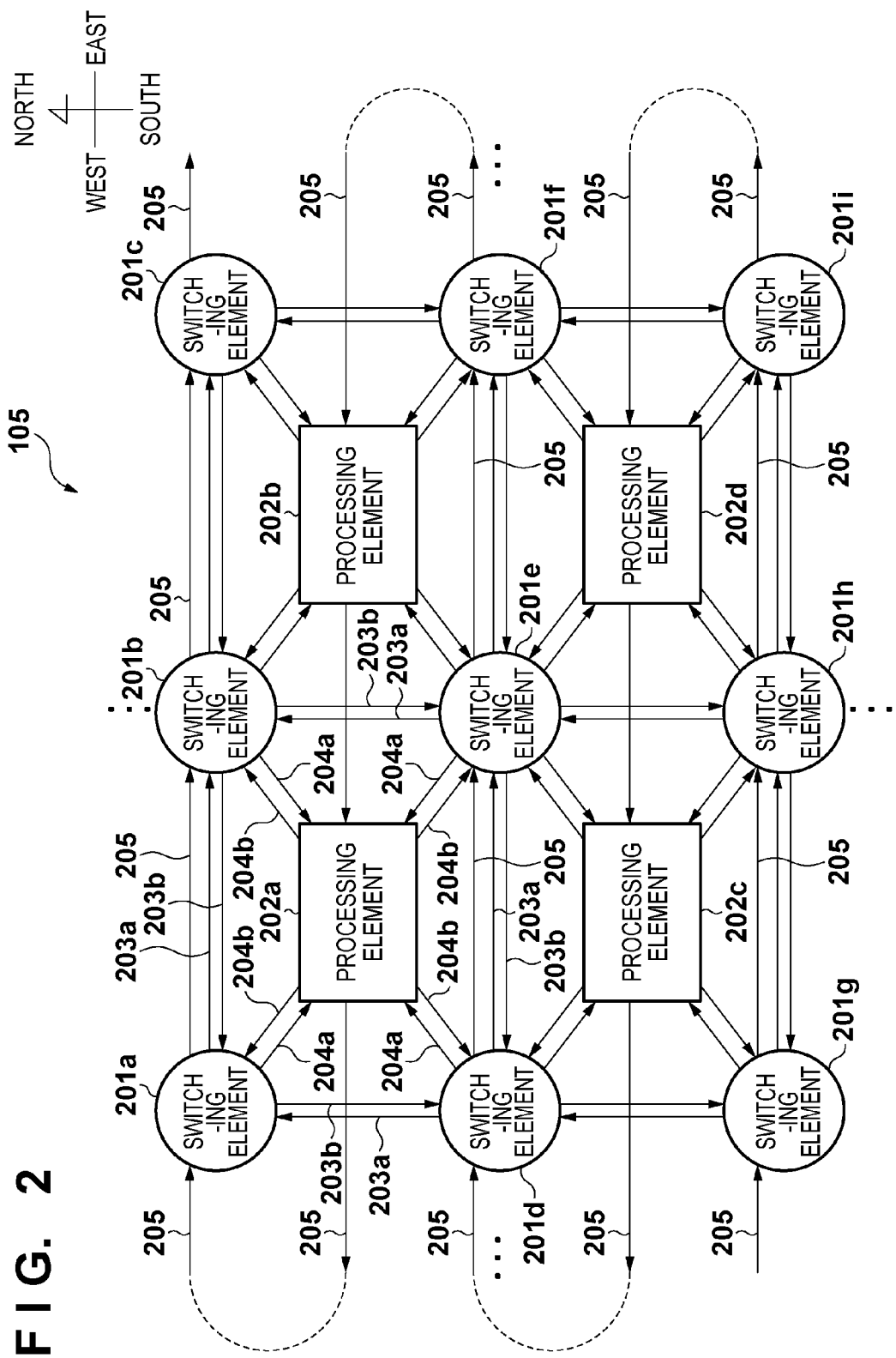
FIG. 2 is a view showing an example of the configuration of the reconfigurable device.

FIG. 2 is a view showing an overview of the processing element array serving as the reconfigurable device 105 according to this embodiment. In the reconfigurable device 105, switching elements 201 each serving as an input/output processing means with 8 inputs and 8 outputs are arranged in a two-dimensional grid pattern, and processing elements 202 each serving as a computation processing means with 4 inputs and 4 outputs are arranged within the grid of the switching elements 201. Of the 8 inputs and 8 outputs of each of switching elements 201a to 201i, four sets of one input and one output are respectively connected with other four switching elements 201 in the east, west, south, and north (right, left, lower, and upper) directions by connections 203a and 203b. Furthermore, other four sets of one input and one output are respectively bidirectionally connected with other four processing elements 202 in the northeast, southeast, southwest, and northwest directions by connections 204a and 204b. The switching elements 201a to 201i and processing elements 202a to 202d are connected in series in one direction by a connection 205.

The connections 203a, 203b, 204a, and 204b are connected to communicate data to be processed among the switching elements 201 and processing elements 202. The connection 205 is used to supply settings to the switching elements 201 and processing elements 202. Based on the settings, the switching element 201 determines the input and output destinations of data to be processed, and the processing element 202 determines the processing contents and input and output destinations of data to be processed. Note that the direction of the arrow of each of the connections 203a, 203b, 204a, 204b, and 205 in FIG. 2 indicates the direction of data. The switching elements 201a to 201i have the same configuration, and the processing elements 202a to 202d have the same configuration.

FIG. 3 shows a 2-wire handshake using a Valid signal and a Ready signal as an example of the communication protocol of each of the connections 203a, 203b, 204a, 204b, and 205. Referring to FIG. 3, a data signal line 303, a Valid signal line 304, and a Ready signal line 305 are connected between a module A 301 as the sender side and a module B 302 as the receiver side. A Valid signal is used by the sender side to indicate a sending enable state for the receiver side through the Valid signal line 304. A Ready signal is used by the receiver side to indicate a data receiving enable state for the sender side through the Ready signal line 305. In this protocol, data of the data signal line 303 is sent from the module A 301 to the module B 302 at the leading edge of a clock when the Valid signal line 304 of the module A 301 and the Ready signal line 305 of the module B 302 active. In a waveform shown in FIG. 3, data A, B, C, and D are transferred from the module A 301 to the module B 302 at timings 306a, 306b, 306c, and 306d, respectively.

Figure 4:
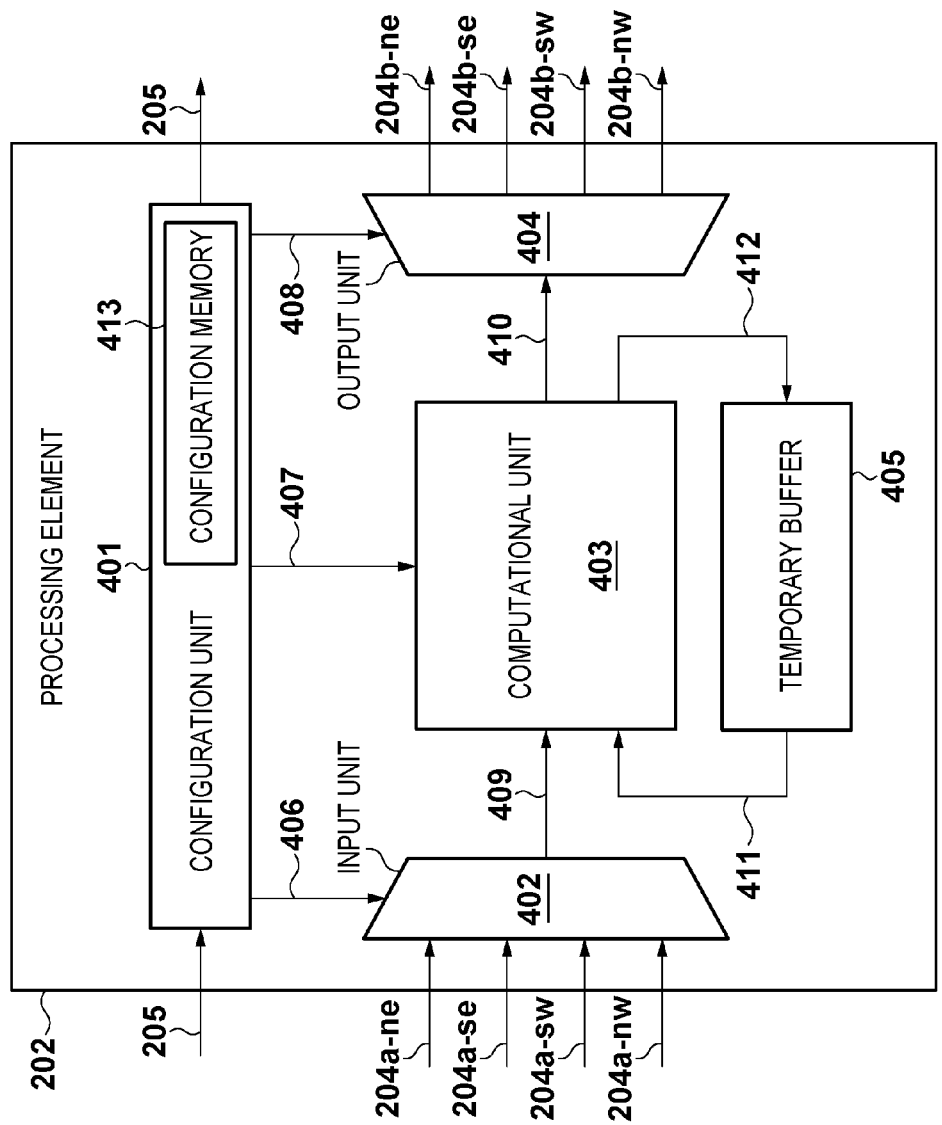
FIG. 4 is a view showing an example of the configuration of a processing element.

FIG. 4 shows the configuration of the processing element 202. The processing element 202 includes a configuration unit 401, an input unit 402, a computational unit 403, an output unit 404, and a temporary buffer 405.

The configuration unit 401 manages settings for determining the operation contents of the processing element 202. The input unit 402 executes input processing based on the settings of the configuration unit 401. The computational unit 403 executes computation processing based on the settings of the configuration unit 401. Furthermore, the computational unit 403 can hold a processing result in the temporary buffer 405 for inputting to the computational unit 403 again. The output unit 404 executes output processing based on the settings of the configuration unit 401.

The operation of the processing element 202 will be described in more detail. The input unit 402 acquires settings for determining an input destination from the configuration unit 401 through a connection 406. The acquired settings specify an input port to be used to communicate with an externally connected module. Based on the information, data to be processed is acquired through a connection 204a-ne, 204a-se, 204a-sw, or 204a-nw. Note that reference symbols ne, se, sw, and nw respectively indicate directions. The connection 204a-ne is connected with a switching element arranged in the northeast. The connection 204a-se is connected with a switching element arranged in the southeast. The connection 204a-sw is connected with a switching element arranged in the southwest. The connection 204a-nw is connected with a switching element arranged in the northwest. The acquired data is sent to the computational unit 403 through a connection 409.

The computational unit 403 acquires settings for determining processing contents from the configuration unit 401 through a connection 407. Based on the acquired settings, the unit 403 acquires data sent from the input unit 402, and executes set processing. The unit 403 then sends the processed data to the output unit 404 through a connection 410.

The computational unit 403 has at least one computation unit. The computation unit includes, for example, a computation unit such as an adding/subtracting unit, comparator, multiplier, divider, or logical computation unit, a combination of those units, or a combination of those units and other computation units. Assume that, as a practical example, the computational unit 403 can execute computation of the sum of products and a comparison operation, and can selectively execute one of the processes in one operation. In the computation of the sum of products, the unit 403 calculates a·b+c·d. In the comparison operation, if a>b, the unit 403 outputs c; otherwise, the unit 403 outputs d. The computational unit 403 is further configured to be able to repeatedly use the computation unit for one input. When the computation unit is repeatedly used, a processing result used in the computation unit is temporarily saved in the temporary buffer through a connection 412, and is then input to the computational unit 403 again through a connection 411. The unit 403 executes, in the computation unit, processing for the data input again. The above settings specify the type of computation, repetitive processing, and values referred to by the variables a, b, c, and d necessary for the respective processes or the values of the variables a, b, c, and d if they are fixed values, which will be described later.

The output unit 404 acquires settings indicating the output destination of processed data through a connection 408. The acquired settings specify an output port to be used to communicate with a switching element. Based on the information, the data is output to a switching element through a connection 204b-ne, 204b-se, 204b-sw, or 204b-nw. Note that the connection 204b-ne is connected with a switching element arranged in the northeast. The connection 204b-se is connected with a switching element arranged in the southeast. The connection 204b-sw is connected with a switching element arranged in the southwest. The connection 204b-nw is connected with a switching element arranged in the northwest.

The operation of the configuration unit 401 will be described next. The configuration unit 401 holds a unique ID for each processing element 202. The configuration unit acquires settings sent from the connection 205 on the input side, processes them within itself, and outputs the settings through the connection 205 on the output side. The configuration unit 401 has a configuration memory 413 for storing settings corresponding to its own ID.

FIG. 5 shows a configuration command 501 for settings sent/received to/from the configuration unit. The configuration command 501 includes a read/write mode 502, an ID 503, a configuration address 504, and a setting value 505. The read/write mode 502 is a signal for determining read/write processing of the configuration command. The ID 503 is a signal for determining the processing element 202 to be processed. The configuration address 504 is a signal for specifying an address within the memory holding the settings of the configuration unit 401. The setting value 505 is a signal representing an actual setting value. Bit widths M, N, O, and P in FIG. 5 are determined based on an actual architecture.

Settings based on the above-described configuration will be described in more detail below. Referring to FIG. 6, reference numeral 601 denotes an address of the configuration memory 413, which corresponds to an address specified by the configuration address 504 of FIG. 5. Reference numeral 602 denotes an actual setting value which corresponds to the setting value 505 of FIG. 5. In this embodiment, each value is referred to as a setting. The present invention, however, is not limited to the above unit. In FIG. 6, settings associated with the input unit 402, computational unit 403, and output unit 404 are held in the configuration memory 413.

A setting value at an address 0x0000_0000 ("0x" indicates a hexadecimal number) is used to determine the input destination of the input unit 402, and a predetermined input destination is determined based on the value. An iteration number at an address 0x0000_0004 is used to determine a computation iteration count in the computational unit 403, and the computation iteration count is determined based on the value. In this embodiment, up to four computations are assumed.

An operating setting at an address 0x0000_0008 is used to determine the type of computation executed in the first operation, and whether computation of the sum of products or a comparison operation is executed is determined based on the value.

A variable setting at an address 0x0000_000c is used to determine a reference destination of the value of the variable a in the first computation. An example of the reference destination includes an input value from an input port, a fixed value held in the configuration memory 413, and a value of the temporary buffer which holds a preceding computation result. One of these values is input to the variable a according to the value at this address. Similarly to the address 0x0000_000c, variable settings at addresses 0x0000_0010, 0x0000_0014, and 0x0000_0018 are used to determine reference destinations of the values of the variables b, c, and d in the first computation, respectively. A parameter at an address 0x0000_001c has a fixed value for the variable a when the reference destination specified at the address 0x0000_000c is a fixed value in the first computation. Similarly to the address 0x0000_001c, fixed values at addresses 0x0000_0020, 0x0000_0024, and 0x0000_0028 are used for the variables b, c, and d in the first computation.

Values at addresses 0x0000_002c to 0x0000_0094 indicate setting values in the second, third, and fourth computations, respectively, similarly to the settings associated with the first computation at the addresses 0x0000_0008 to 0x0000_0028. Finally, an output select value at an address 0x0000_0098 is a setting value for determining the output destination of the output unit 404, and a predetermined output destination is determined based on the value.

Figure 7:
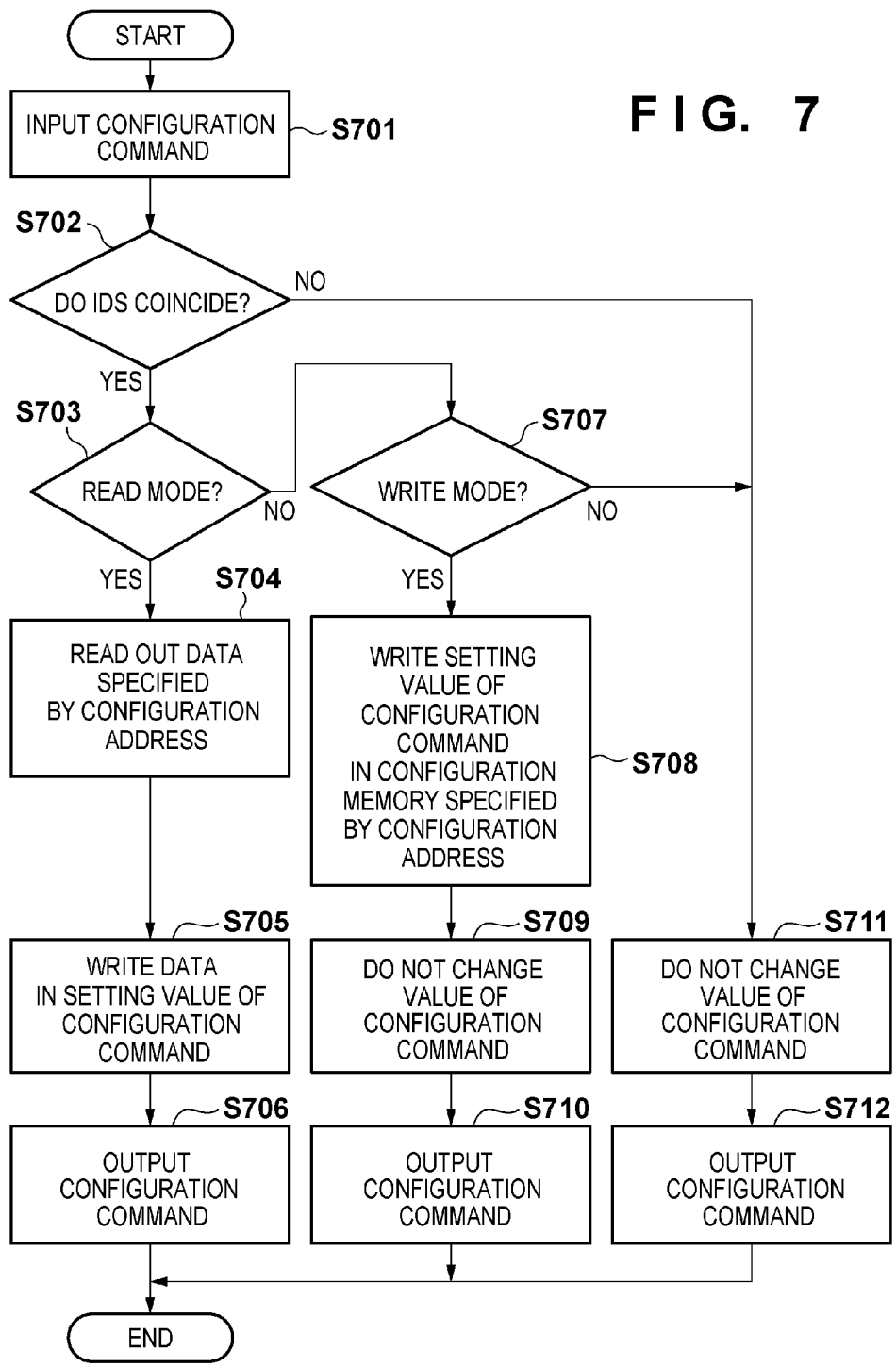
FIG. 7 is a flowchart illustrating a procedure of reading/writing the settings.

FIG. 7 shows a processing procedure executed in the configuration unit. In step S701, the configuration command 501 is input. In step S702, the configuration unit 401 determines whether the ID 503 specified by the input configuration command 501 coincides with the ID of itself. If the unit 401 determines in step S702 that the ID 503 does not coincide with the ID of itself, it outputs the input configuration command 501 without executing any processing in steps S711 and S712; otherwise, the unit 401 determines in step S703 whether the value of the read/write mode 502 indicates a read mode. If the value does not indicate a read mode, the unit 401 determines in step S707 whether the value indicates a write mode. If neither of the modes is indicated, the unit 401 outputs the command 501 without executing any processing in steps S711 and S712. If it is determined that the value indicates a read mode, the unit 401 reads out data specified by the configuration address 504 from the configuration memory 413 in step S704. Then, the unit 401 writes the readout data in the setting value 505 of the input configuration command 501 in step S705, and outputs the configuration command 501 in step S706. If it is determined that the value indicates a write mode, the unit 401 writes the setting value 505 of the input configuration command 501 in the configuration memory 413 specified by the configuration address 504 in step S708. The unit 401 does not change the value of the input configuration command 501 in step S709, and outputs it intact in step S710. It is possible to change one setting value 505 for one configuration command. By sequentially send configuration commands, and changing all necessary setting values, desired processing is implemented. That is, the switching time of processing contents is determined based on the number of settings.

Figure 8:
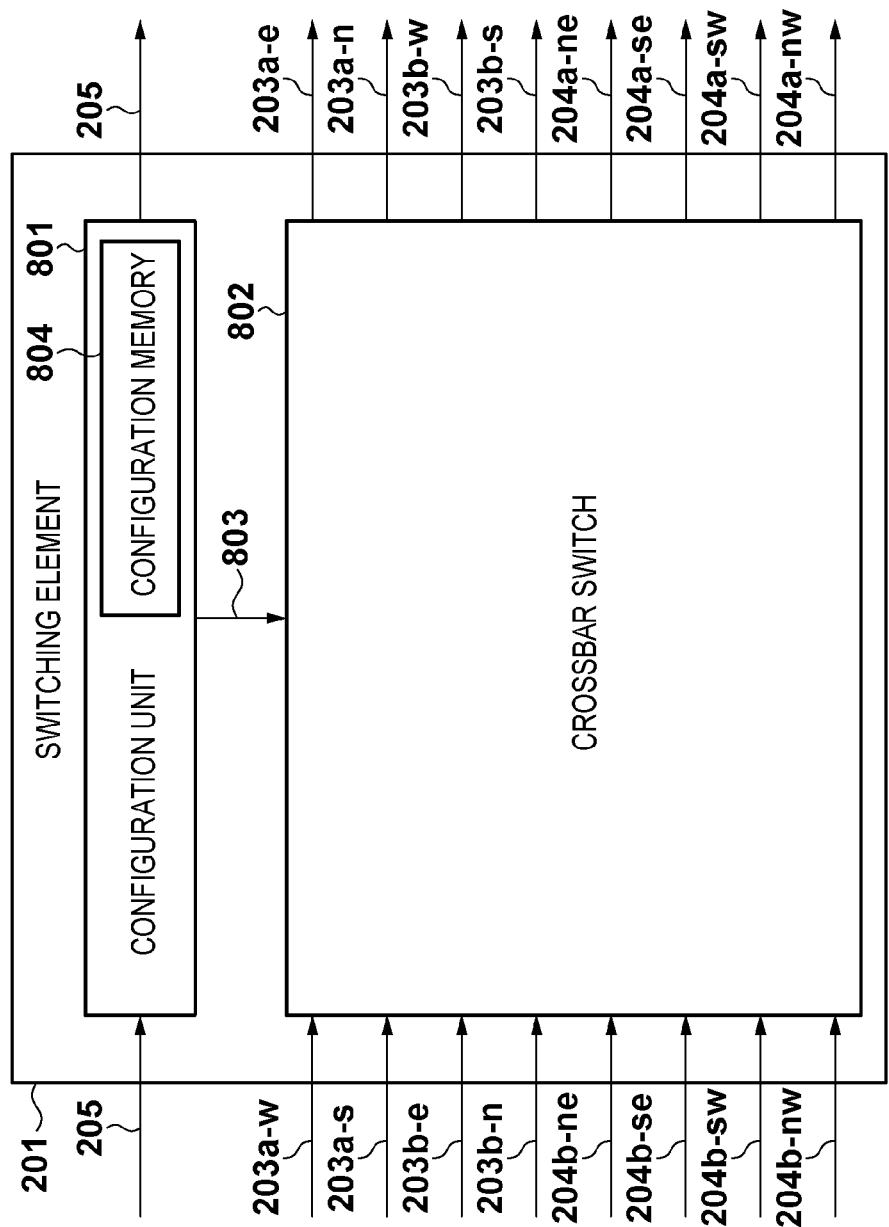
FIG. 8 is a view showing an example of the configuration of a switching element.

FIG. 8 shows the configuration of the switching element 201. The switching element 201 includes a configuration unit 801 and a crossbar switch 802. The configuration unit 801 manages setting values for determining a connection destination to which data is transferred. The crossbar switch 802 connects inputs and outputs in a one-to-one correspondence based on the settings of the configuration unit 801. Similarly to the configuration unit 401 of the processing element 202, the configuration unit 801 holds a unique ID for each switching element 201. The configuration unit 801 acquires setting values sent from the connection 205 on the input side, executes processing within the configuration unit, and outputs the setting values through the connection 205 on the output side. The configuration unit 801 holds the acquired settings in the configuration memory 804. The configuration command and processing procedure of the configuration unit 801 are the same as those shown in FIGS. 5 and 7, respectively. The crossbar switch 802 acquires settings for determining data input and output destinations from the configuration unit 801 through a connection 803. The switching element 201 acquires data through a connection 203*a-w*, 203*a-s*, 203*b-e*, 203*b-n*, 204*b-ne*, 204*b-se*, 204*b-sw*, or 204*b-nw* based on the acquired setting values. The acquired data is passed through a connected connection 203*a-e*, 203*a-n*, 203*b-w*, 203*b-s*, 204*a-ne*, 204*a-se*, 204*a-sw*, or 204*a-nw*.

Note that the connections 203*a-w* and 203*a-s* indicate connections with switching elements arranged in the west and south, respectively. The connections 203*b-e* and 203*b-n* indicate connections with switching elements arranged in the east and north, respectively.

The connections 203*a-e* and 203*a-n* indicate connections with switching elements arranged in the east and north, respectively. The connections 203*b-w* and 203*b-s* indicate connections with switching elements arranged in the west and south, respectively.

The connections 204*a-ne*, 204*a-se*, 204*a-sw*, and 204*a-nw* indicate connections with switching elements arranged in the northeast, southeast, southwest, and northwest, respectively. The connections 204*b-ne*, 204*b-se*, 204*b-sw*, and 204*b-nw* indicate connections with switching elements arranged in the northeast, southeast, southwest, and northwest, respectively.

Figures 9, 10:
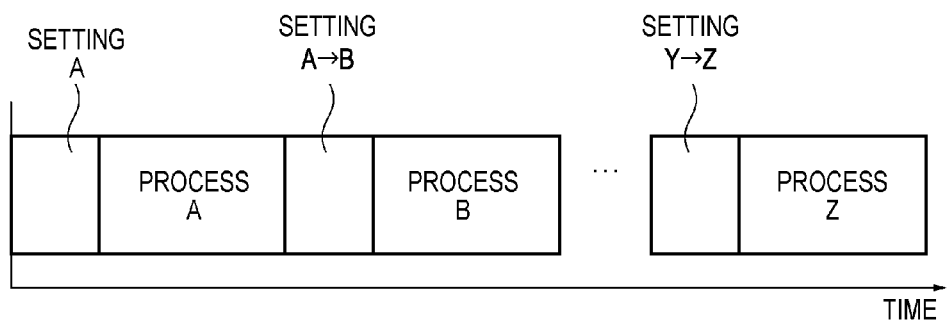
FIG. 9 is a view showing an overview of settings stored in the configuration memory of the switching element.
FIG. 10 is a time chart showing sequential execution of a plurality of data flows.

FIG. 9 shows settings associated with connections of the inputs/outputs of the crossbar switch 802 of the switching element 201, which are held in the configuration memory 804. Reference numeral 901 denotes a memory address, which corresponds to an address specified by the configuration address 504 of FIG. 5; and 902, a setting value, which corresponds to the setting value 505 of FIG. 5. A connection setting at an address 0x0000_0000 has a setting value for determining the connection 203*a-e*, 203*a-n*, 203*b-w*, 203*b-s*, 204*a-ne*, 204*a-se*, 204*a-sw*, or 204*a-nw* to which an input from the connection 203*a-w* is output. A setting value at an address 0x0000_0004 is used to determine a connection to which an input from the connection 203*a-s* is output, similarly to the address 0x0000_0000. A setting value at an address 0x0000_0008 is used to determine a connection to which an input from the connection 203*b-e* is output, similarly to the address 0x0000_0000. A setting value at an address 0x0000_000c is used to determine a connection to which an input from the connection 203*b-n* is output, similarly to the address 0x0000_0000. A setting value at an address 0x0000_0010 is used to determine a connection to which an input from the connection 204*b-ne* is output, similarly to the address 0x0000_0000. A setting value at an address 0x0000_0014 is used to determine a connection to which an input from the connection 204*b-se* is output, similarly to the address 0x0000_0000. A setting value at an address 0x0000_0018 is used to determine a connection to which an input from the connection 204*b-sw* is output, similarly to the address 0x0000_0000. A setting value at an address 0x0000_001c is used to determine a connection to which an input from the connection 204*b-nw* is output, similarly to the address 0x0000_0000.

FIG. 10 shows a time chart for implementing desired processing by changing a plurality of types of configurations of the above-described reconfigurable device. FIG. 10 is a time chart in which one reconfigurable device sequentially executes a plurality of different data flows A to Z. In this embodiment, data flow input is executed to input the data flows and the execution order of the data flows. A data flow handled in this embodiment is formed by a processing unit which is assignable to the reconfigurable device at once. Settings for processing each data flow are generated in advance. The reconfigurable device is reconstructed based on the settings generated in advance for itself, and processing is executed with that configuration. These processes are executed for the data flows in a desired execution order.

Assume that the data flow A has undergone a processing assignment, and the data flow B is a processing assignment target. More specifically, setting values for executing the data flow A having undergone a processing assignment are referred to, and then the processing assignment of the data flow B is determined. After determining the processing assignment of the data flow B by referring to the processing assignment of the data flow A, it is considered that the data flow B has undergone a processing assignment and the data flow C is a processing assignment target. More specifically, similarly to determination of the processing assignment of the data flow B, setting values for executing the data flow B having undergone a processing assignment are referred to, and then the processing assignment of the data flow C is determined. Repeating the above procedure enables to execute a processing assignment for the data flows A to Z.

Figure 11:
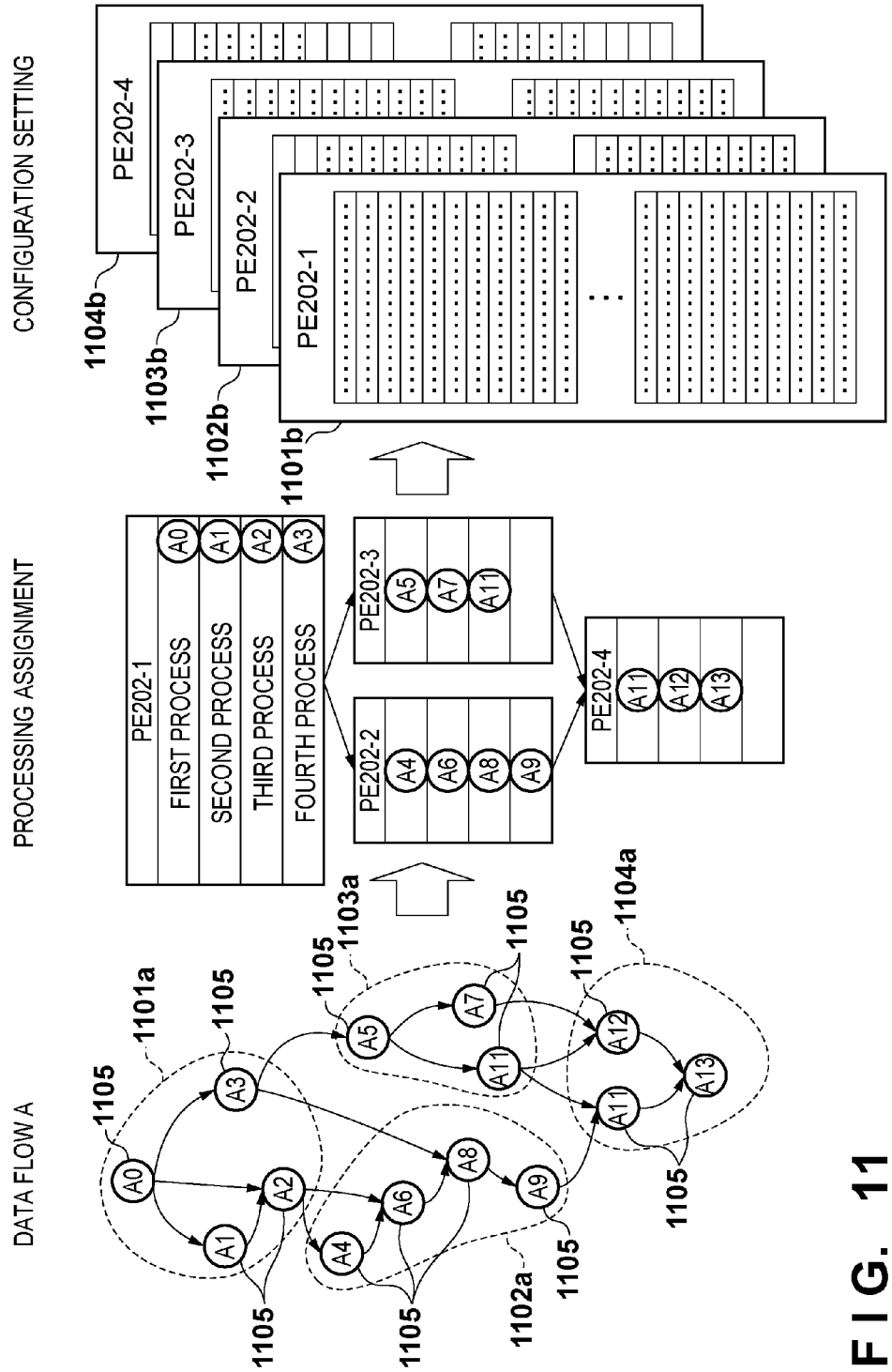
FIG. 11 is a view showing an overview of a processing assignment.

The assignment of the processes of a data flow to the processing elements of the reconfigurable device will be described. The assignment of the processes of a data flow to the processing elements indicates a method of logically assigning the respective processes of the data flow to the processing elements. More specifically, as shown in FIG. 11, a processing element in which processing contents corresponding to each node 1105 of the data flow are executed is determined, and an execution order is also determined. The data flow A is shown on the left side of FIG. 11. A processing assignment example is shown in the middle of FIG. 11. The settings shown in FIG. 6 which are based on the processing assignment are shown on the right side of FIG. 11. As described above, as a function of the processing element described in this embodiment, a process iteration count, processing contents of each process, and fixed values required for the processing contents are assumed, and these settings are actually determined. Assume that a maximum process iteration count is four in this embodiment. Groups 1101*a* to 1104*a* are respectively assigned to the different processing elements 202 in sequence. Based on the groups 1101*a* to 1104*a*, settings 1101*b* to 1104*b* for processing elements 202-1 to 202-4 are determined, respectively.

Figure 12:
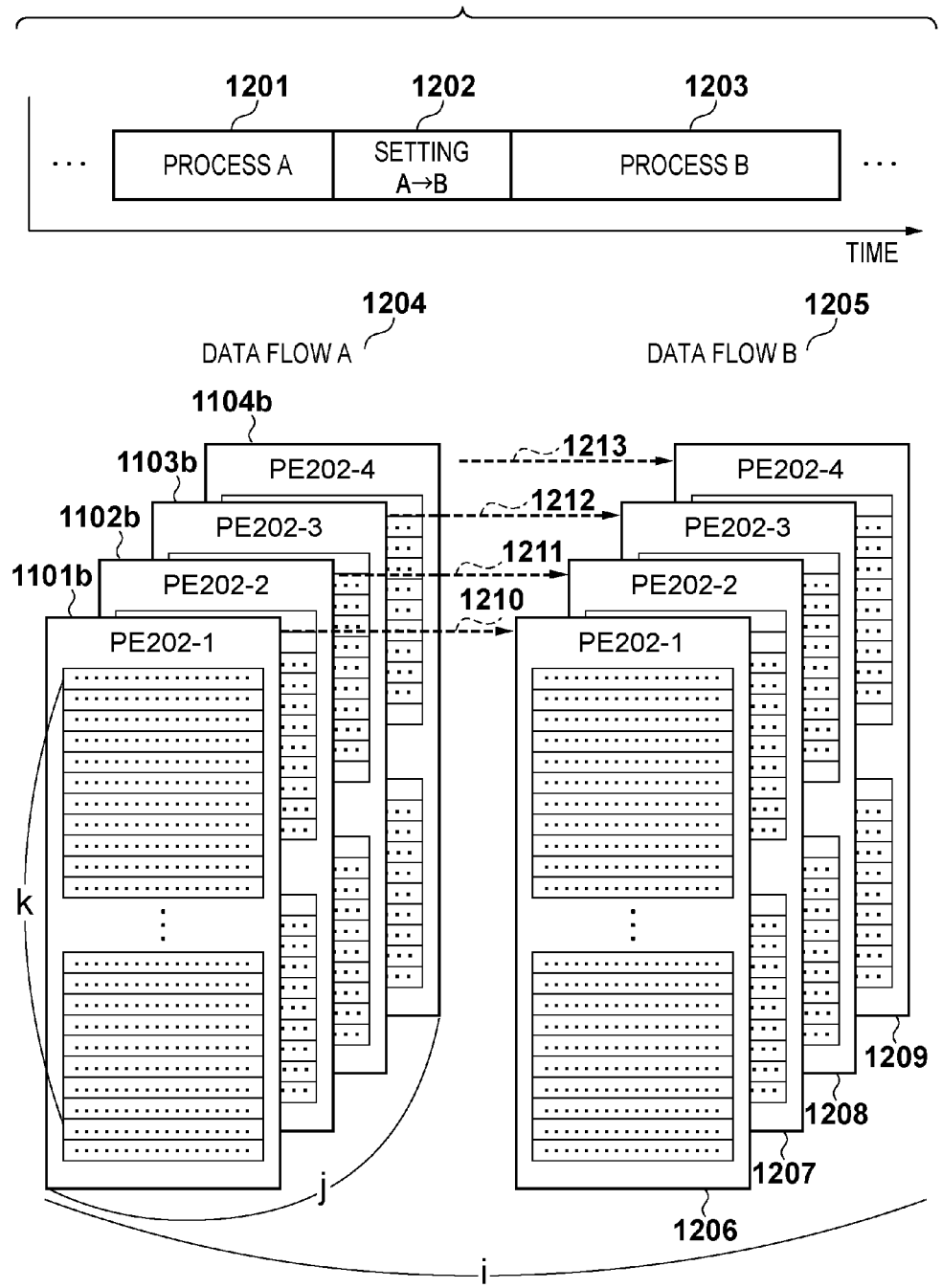
FIG. 12 is a view showing an overview for executing the processing assignment of the data flows according to the first embodiment.

According to the present invention, there is provided a processing assignment method for decreasing the number of settings shown in FIG. 11 which are required when processing contents (a data flow) are switched in one reconfigurable device, as shown in FIG. 10. FIG. 12 shows an overview of setting changes of the processing elements 202-1 to 202-4 when processing in the reconfigurable device is switched from the data flow A to the data flow B. Assume that the processing of a data flow 1204 corresponds to processing 1201 in a time chart, and has already been assigned. Assume also that the processing of a data flow 1205 corresponds to processing 1203 in the time chart, and the data flow 1205 is a processing assignment target. The processing elements 202-1 to 202-4 to which the processes of the data flows 1204 and 1205 are assigned indicate logically identical processing elements. The settings 1101*b* to 1104*b* are associated with the processing elements 202-1 to 202-4 in the processing of the data flow A, respectively. Settings 1206 to 1209 are associated with the processing elements 202-1 to 202-4 in the processing of the data flow B, respectively. In the processing element 202-1, a setting change 1210 is made from the settings 1101*b* to the settings 1206 during a setting change period 1202 from the data flow A to the data flow B in the time chart. In the processing element 202-2, a setting change 1211 is made from settings 1102b to the settings 1207 during the setting change period 1202 from the data flow A to the data flow B in the time chart. In the processing element 202-3, a setting change 1212 is made from settings 1103b to the settings 1208 during the setting change period 1202 from the data flow A to the data flow B in the time chart. In the processing element 202-4, a setting change 1213 is made from settings 1104b to the settings 1209 during the setting change period 1202 from the data flow A to the data flow B in the time chart. In this embodiment, to execute a processing assignment for the data flow B, the data flow A having undergone a processing assignment in the processing elements 202-1 to 202-4 is referred to. Then, a processing assignment is executed for the data flow B for the purpose of decreasing a setting change count necessary for making the setting changes 1210, 1211, 1212, and 1213.

Figure 25:
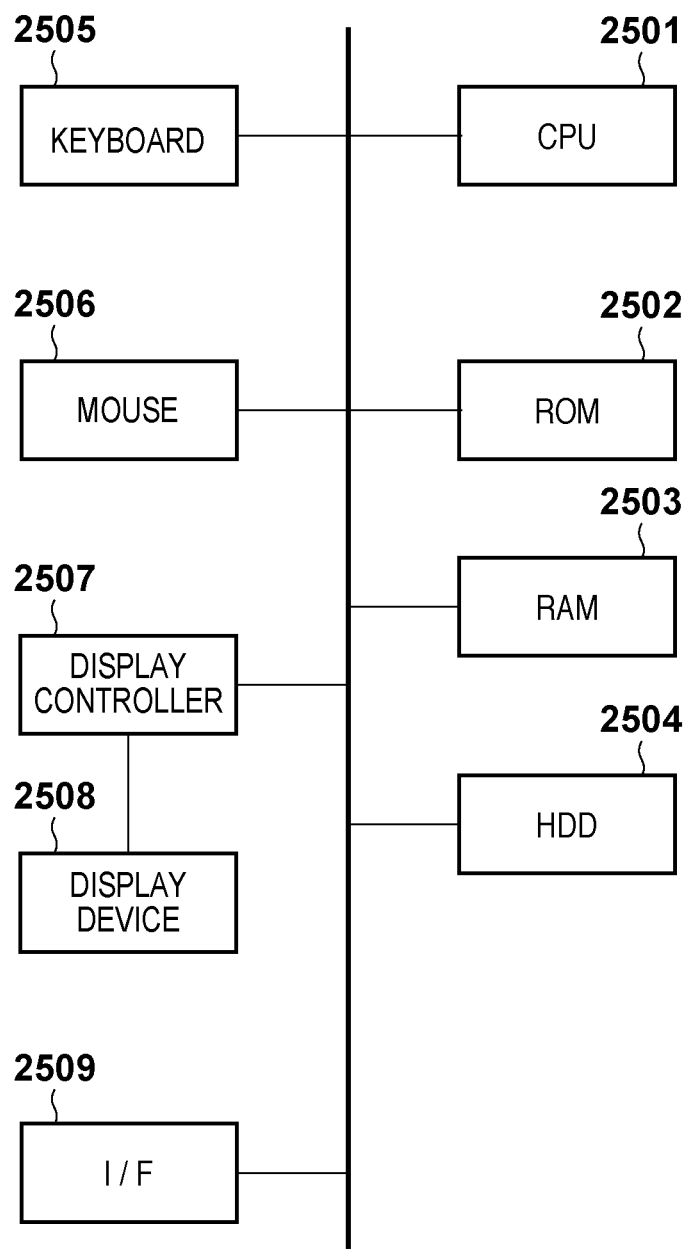
FIG. 25 is a block diagram showing the configuration of an apparatus for creating circuit configuration information.

FIG. 25 is a block diagram showing the configuration of an apparatus for generating the circuit configuration information 106 when transiting from the data flow A to the data flow B. Referring to FIG. 25, reference numeral 2501 denotes a CPU which controls the apparatus as a whole; 2502, a ROM storing a boot program and BIOS; 2503, a RAM for storing an OS (Operating System) and applications, which is used as a work area for the CPU 2501; and 2504, a hard disk drive (HDD) for storing an OS, an application for creating the circuit configuration information 106, and various kinds of data. A keyboard 2505 and a mouse 2506 each function as a user interface. Reference numeral 2507 denotes a display controller which incorporates a video memory and a display controller; and 2508, a display device for receiving a video signal from the display controller 2507 and displaying it. Reference numeral 2509 denotes an interface for communicating with various kinds of external devices. If, for example, the interface 2509 is connected with the external memory 101 shown in FIG. 1, the circuit configuration information 106 created by the apparatus is written in the external memory 101.

When the apparatus with the above configuration is powered on, the CPU 2501 executes the boot program stored in the ROM 2502, loads the OS stored in the HDD 2504 into the RAM, and then starts the application for creating the circuit configuration information 106, thereby causing the apparatus to function as a circuit configuration information creation apparatus.

The processing procedure of the apparatus functioning as a circuit configuration information creation apparatus will be described below with reference to a flowchart shown in FIG. 13. Although the procedure is an example of a processing assignment method based on simulated annealing, the present invention is not limited to this. Various numerical optimization methods and approximate solutions such as genetic algorithms may be used.

Elements necessary for explanation of the flowchart will be described with reference to FIG. 12. Let i be an index indicating each data flow, j be the index of a processing element, and k be a configuration address of the memory within the processing element, which corresponds to the address 601 of FIG. 6. Then, $u_{i,j,k}$ represents a setting value within each memory. Assume that a data flow i0 has undergone a processing assignment and a data flow i1 is a processing assignment target. In step S1301, a plurality of data flows and their execution order relation (the sequence of i) are input. For a data flow having undergone a processing assignment, its setting value $u_{i0,j,k}$ is also input. In this embodiment, the data flow 1204 has already undergone a processing assignment, and setting values associated with the data flow 1204 within the memory of each processing element are fixed values. The data flow 1205 is a processing assignment target.

In step S1302, required specifications and hardware constraints are input. The hardware constraints include constraints of a hardware configuration such as the number of processing elements within the reconfigurable device, a process iteration count processable in a processing element, and the type of computation unit. The required specifications include items which should be limited in use of hardware, such as the number of processing elements used, a process iteration count, and the type of available computation unit. The constraints also include that there is no contradiction in the sequence relation between inputs and outputs of processes, and that there is no deadlock. For a data flow having undergone a processing assignment, the constraints include that the processing assignment is not changed. Note that the present invention is not limited to the above-described constraints.

In step S1303, a processing assignment is executed for a data flow as a processing assignment target. As an initial processing assignment method, a method of randomly assigning processes, or a method of assigning processes in the depth direction order of the data flow is used. The present invention, however, is not limited to them. Except in an initial assignment, the processing assignment is changed based on simulated annealing so that two arrangements are randomly selected and exchanged. In this embodiment, an initial processing assignment or a processing assignment change is executed for the data flow 1205 as a processing assignment target. For a data flow having undergone a processing assignment, no processing assignment change is made according to the constraints.

In step S1304, it is determined whether a processing assignment result satisfies the required specifications input in step S1302.

As represented by equation (1) below, if the constraints are satisfied, 0 is set in a penalty variable $p_0$; otherwise, a penalty value $C_{p0}$ is set in the penalty variable $p_0$.

$$\text{penalty variable } P_0 = \begin{cases} C_{p0} & \text{if } constraintviolation \\ 0 & \text{otherwise} \end{cases} \quad (1)$$

In this embodiment, if the constraints are violated, $C_{p0}$ is considered as a constant. However, $C_{p0}$ may be a variable value according to a violated item. In step S1305, it is determined whether the processing assignment result satisfies the hardware constraints input in step S1302. As represented by equation (2) below, if the constraints are satisfied, 0 is set in a penalty variable $P_1$; otherwise, a penalty value $C_{p1}$ is set in the penalty variable $P_1$.

$$\text{penalty variable } P_1 = \begin{cases} C_{p1} & \text{if } constraintviolation \\ 0 & \text{otherwise} \end{cases} \quad (2)$$

In this embodiment, if the constraints are violated, $C_{p1}$ is considered as a constant. However, $C_{p1}$ may be a variable value according to a violated item. In step S1306, a setting change count when the target data flow is changed is calculated, thereby computing an evaluated value. Referring to the example of FIG. 12, the evaluated value indicates the number of settings which need to be changed in the setting changes 1210, 1211, 1212, and 1213. More specifically, if the setting value $u_{i0,j,k}$ in the data flow i0 having undergone a processing assignment is not equal to the setting value $u_{i1,j,k}$ at the same address in the data flow i1 as a processing assignment target, $\alpha_1$ is added to the setting change count; otherwise, no addition operation is executed. The above computation is executed for all the memories k of all the processing elements j. The setting change count described above can be given by $$\text{setting change count} = s = \sum_{i,j} \begin{cases} \alpha_1 & \text{if } (u_{i0,j,k} \neq u_{i1,j,k}) \\ 0 & \text{otherwise} \end{cases} \quad (3)$$

where $\alpha_1$ is generally 1. It is, however, possible to change the weight for each address at which a setting is stored depending on the structure of the configuration memory of the processing element. It is also possible to assign the weight for each data flow to assign priority to the switching time for each data flow.

As shown in FIG. 7, it is possible to change one setting value for one configuration command. If, therefore, the number of commands decreases, it is possible to shorten a switching time for processing contents. Based on the above equations, an equation for calculating an evaluated value in this step is given by evaluated value=$s+p0+p1$ (4)

That is, while the required specifications and hardware constraints are satisfied, the above evaluated value becomes smaller as the setting change count necessary for reconstruction is smaller. Finally, it is determined based on simulated annealing in step S1307 whether a target has been reached. If the target has been reached, the process ends; otherwise, the process returns to step S1303 to repeat steps S1303 to S1307. This means that the process is repeated until a sufficiently good result is obtained or a scheduled computation time has elapsed.

As a result, the circuit configuration information 106 is generated in the HDD 2504. It is, therefore, only necessary to write, via the interface 2509, the information in the external memory 101 to be used, and to mount the memory on a commercial product.

Note that a case in which the external apparatus (FIG. 25) creates the circuit configuration information 106 has been explained in this embodiment. This applies to all other embodiments to be described below. The configuration controller 102 may execute the process shown in FIG. 13, and create the circuit configuration information 106. For example, the external memory 101 holds settings (the number of necessary processers, and processing parameters of each processor) for each of a plurality of data flows, and the configuration controller 102 creates the circuit configuration information 106 based on the settings of the plurality of data flows. This also applies to all other embodiments to be described below.

Since a method of assigning the processes of a data flow to processing elements in a general reconfigurable device does not consider a setting change count, it is necessary to change all settings when the processing of the data flow is changed. The present invention focuses on a processing sequence of data flows, and a total change count at a setting level as a minimum unit decreases, thereby enabling to effectively decrease the setting change count.

Second Embodiment

Figure 14:
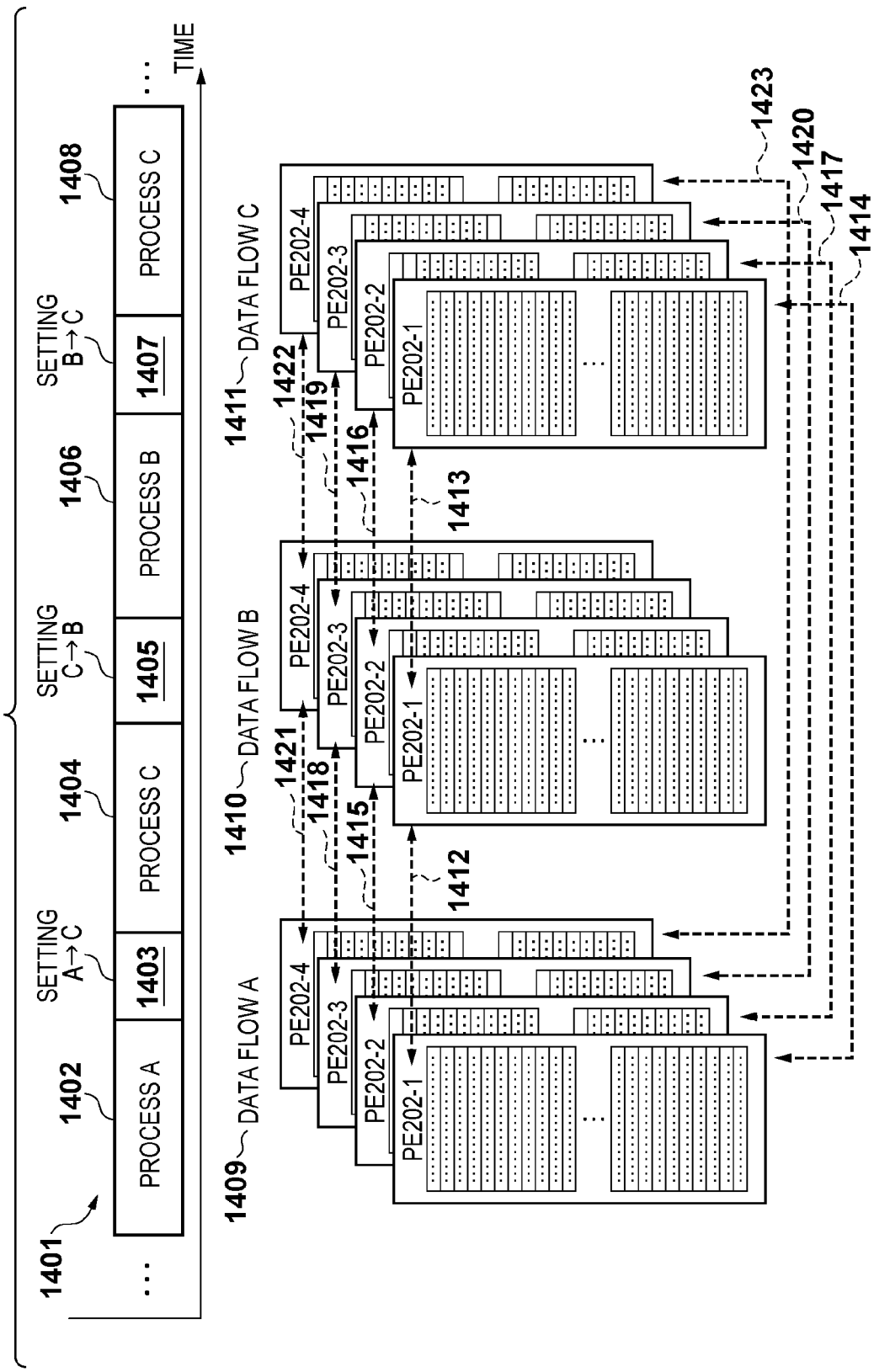
FIG. 14 is a view showing an overview for executing the processing assignment of data flows according to the second embodiment.

The second embodiment of the present invention will be described. FIG. 14 shows a time chart of processes and an overview of a processing assignment according to the second embodiment. This embodiment relates to a processing assignment in a case in which when the processes of a plurality of data flows are executed by changing the settings of a reconfigurable device, the processing contents of each data flow have been determined but the execution order of the data flows is uncertain and changes depending on the situation or input data. More specifically, FIG. 14 assumes a case in which the execution order of processes executed by the reconfigurable device is not constant but changes depending on a result or state, as shown in a time chart 1401.

During a period 1402 in the time chart 1401, processing associated with a data flow A is executed. During periods 1404 and 1408, processing associated with a data flow C is executed. During a period 1406, processing associated with a data flow B is executed. During a period 1403, a setting change is made from the data flow A to the data flow C. During a period 1405, a setting change is made from the data flow C to the data flow B. During a period 1407, a setting change is made from the data flow B to the data flow C. In this embodiment, since the execution order of the data flows A, B, and C is not constant, it is necessary to execute a processing assignment in consideration of all the setting changes between the data flows. All the data flows A, B, and C are processing assignment targets.

In FIG. 14, reference numerals 1409, 1410, and 1411 denote setting examples of PEs 202-1 to 202-4 for the data flows A, B, and C, respectively, and a processing assignment is collectively executed for all the data flows A, B, and C at once. As in the first embodiment, the setting examples 1409, 1410, and 1411 correspond to settings shown in FIG. 6. The second embodiment focuses on a total setting change count, in the PEs 202-1 to 202-4, necessary for data flow changes between the data flows A and B, B and C, and C and A. By calculating the total count as an evaluated value, the setting change count in reconstructing the reconfigurable device is decreased.

Note that reference numerals 1412, 1415, 1418, and 1421 denote setting changes of the PEs 202-1 to 202-4 between the data flows A and B, respectively. Reference numerals 1413, 1416, 1419, and 1422 denote setting changes of the PEs 202-1 to 202-4 between the data flows B and C, respectively. Reference numerals 1414, 1417, 1420, and 1423 denote setting changes of the PEs 202-1 to 202-4 between the data flows C and A, respectively.

The second embodiment is different from the first embodiment in that a processing assignment is simultaneously executed for a plurality of data flows. In step S1301 of FIG. 13, a plurality of data flows are input, and information indicating that an execution order is arbitrary is also input.

Figure 13:
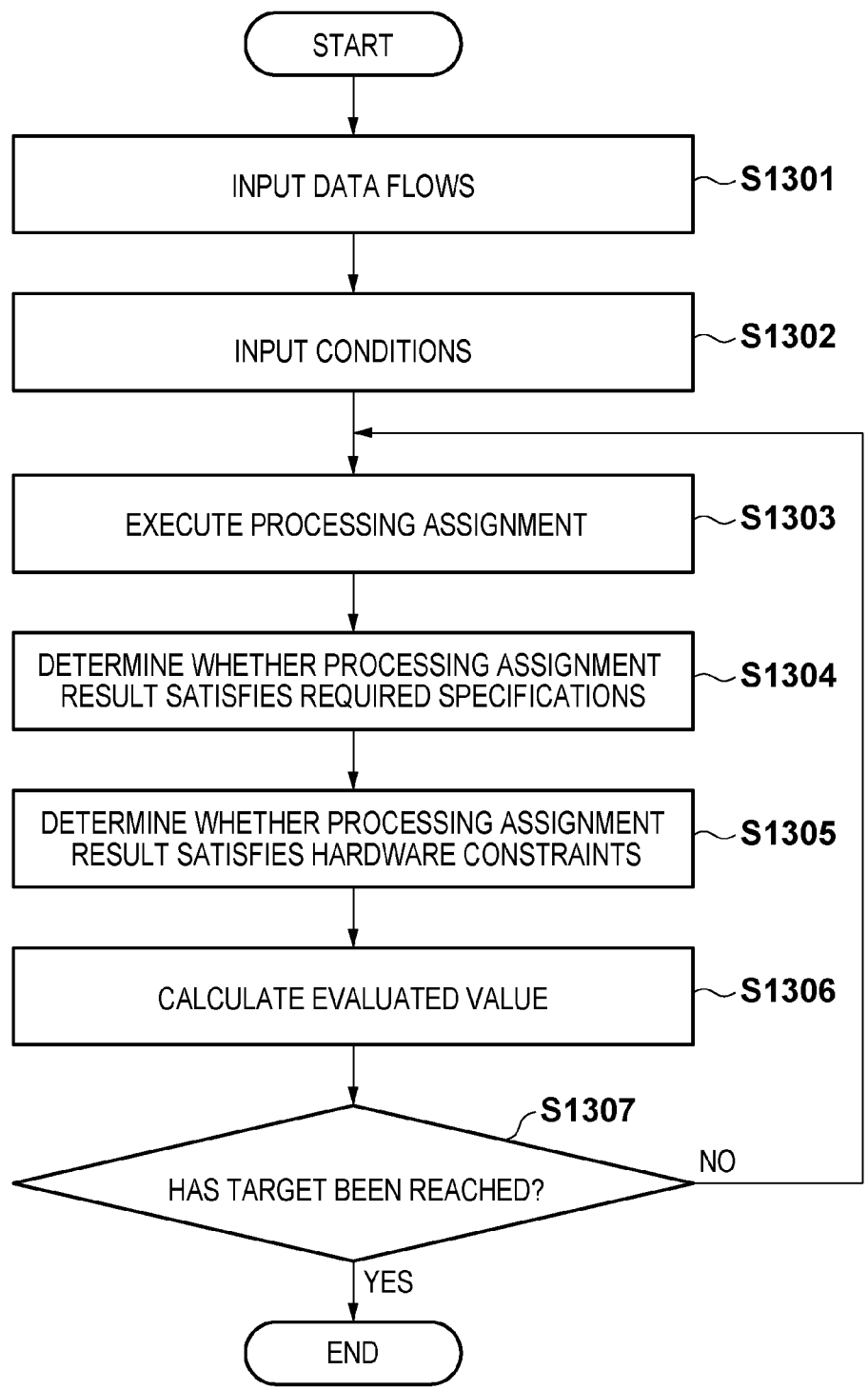
FIG. 13 is a flowchart illustrating processing for executing a processing assignment according to the first embodiment.

A processing assignment in step S1303 of FIG. 13 is executed for all the data flows 1409, 1410, and 1411 as processing assignment targets. With respect to the setting change count used in step S1306 of FIG. 13, there is the following difference as compared with the first embodiment.

If a setting value $u_{i0,j,k}$ in a data flow i0 as a processing assignment target is not equal to a setting value $u_{i1,j,k}$ at the same address in a data flow i1 as a processing assignment target, $\alpha_2$ is added to the setting change count. If the setting value $u_{i1,j,k}$ in the data flow i1 as a processing assignment target is not equal to a setting value $u_{i2,j,k}$ at the same address in a data flow i2 as a processing assignment target, $\beta_2$ is added to the setting change count. Furthermore, if the setting value $u_{i2,j,k}$ in the data flow i2 as a processing assignment target is not equal to the setting value $u_{i0,j,k}$ at the same address in the data flow i0 as a processing assignment target, $\gamma_2$ is added to the setting change count. Alternatively, if the setting values are equal to each other, no addition operation is executed. As represented by equation (5) below, the above computation is executed for all memories k of all processing elements j.

$$\text{setting change count} = \quad (5)$$
$$s = \sum_{i,j} \begin{cases} \alpha_2 & \text{if } (u_{i0,j,k} \neq u_{i1,j,k}) \\ 0 & \text{otherwise} \end{cases} + \sum_{i,j} \begin{cases} \beta_2 & \text{if } (u_{i1,j,k} \neq u_{i2,j,k}) \\ 0 & \text{otherwise} \end{cases} + \sum_{i,j} \begin{cases} \gamma_2 & \text{if } (u_{i2,j,k} \neq u_{i0,j,k}) \\ 0 & \text{otherwise} \end{cases}$$

where i0 indicates the data flow A 1409, i1 indicates the data flow B 1410, and i2 indicates the data flow C 1411. The setting values $u_{i0,j,k}$, and $u_{i2,j,k}$ are determined so that the value represented by the above equation becomes small. Furthermore, $\alpha_2$, $\beta_2$, and $\gamma_2$ are generally 1. It is, however, possible to change the weights for each address at which a setting is stored depending on the structure of the configuration memory of the processing element. It is also possible to assign the weights for each data flow to assign a priority for each data flow in terms of a switching time.

According to the second embodiment, by considering all data flows, it is possible to obtain the effect of decreasing the setting change count on average even if a processing execution order is uncertain.

Third Embodiment

Figure 15:
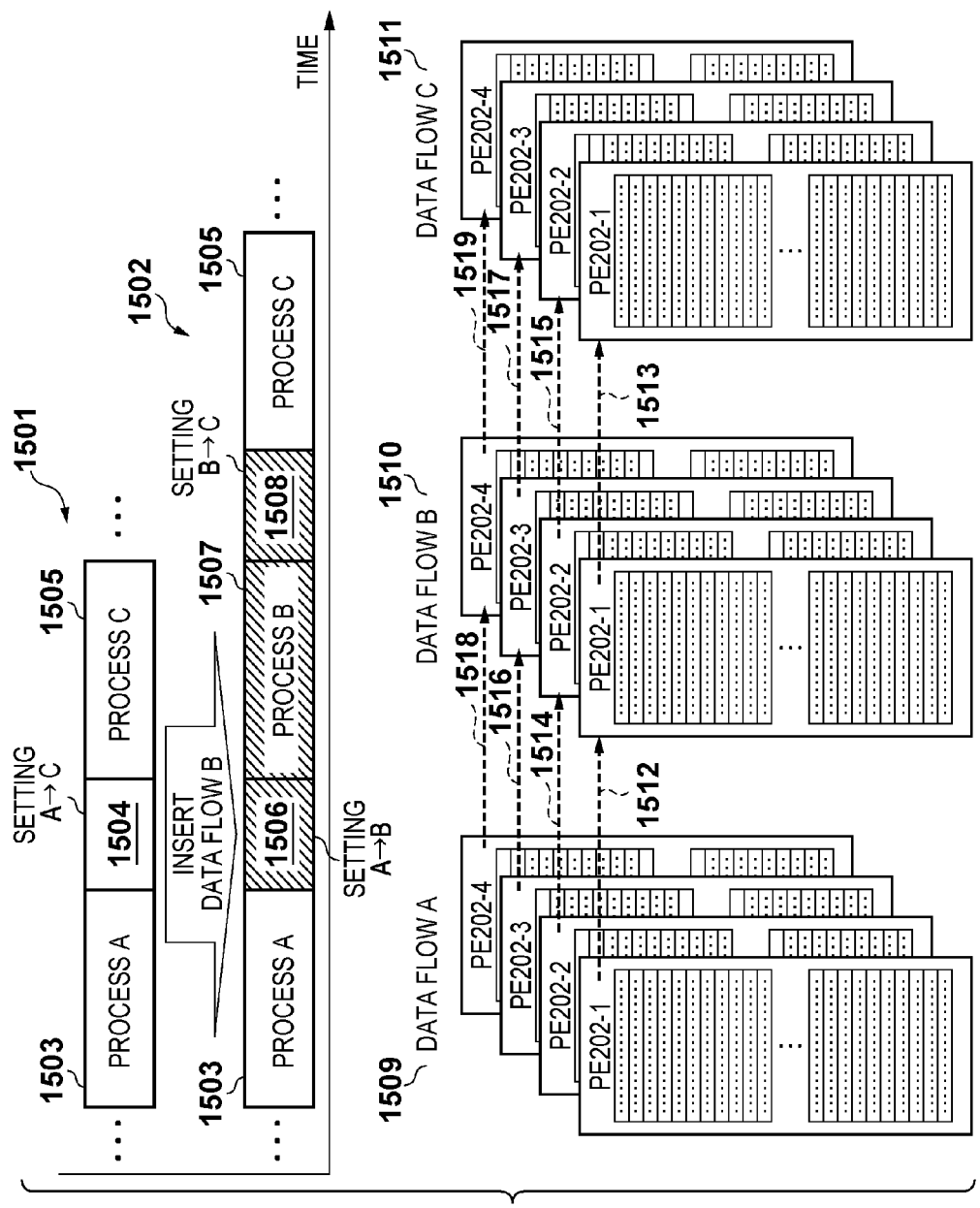
FIG. 15 is a view showing an overview for executing the processing assignment of data flows according to the third embodiment.

The third embodiment of the present invention will be described next. FIG. 15 shows a time chart of processes and an overview of a processing assignment according to the third embodiment. The third embodiment assumes a case in which the execution order of a plurality of data flows and the processing assignment of each data flow have already been determined. This embodiment relates to a processing assignment for inserting processing corresponding to a new data flow between the processes of arbitrary data flows in the above execution order without changing the processing assignments before and after insertion.

For a time chart 1501 shown in FIG. 15, an execution order in a reconfigurable device and a processing assignment have already been determined. In the time chart 1501, after processing 1503 of a data flow A, a period 1504 during which the settings of the data flow A are changed to the settings of a data flow C is inserted, and then processing 1505 of the data flow C is executed. A time chart 1502 is obtained by newly inserting a data flow B between the data flows A and C in the time chart 1501. After the processing 1503 of the data flow A, a period 1506 during which the settings of the data flow A are changed to the settings of the data flow B is inserted, and then processing 1507 of the newly inserted data flow B is executed. Then, after a period 1508 during which the settings of the data flow B are changed to the settings of the data flow C, the processing 1505 of the data flow B is executed. Since the processing assignment of the data flow B is determined without changing the processing assignments of the data flows A and C at this time, a setting change amount between the data flows before and after insertion which have undergone a processing assignment is considered.

In FIG. 15, reference numerals 1509, 1510, and 1511 denote settings of PEs 202-1 to 202-4 in the data flows A, B, and C, respectively. In this embodiment, the data flows A and C have undergone a processing assignment, and a processing assignment is to be executed for the data flow B. As in the first embodiment, the settings 1509, 1510, and 1511 correspond to settings shown in FIG. 6. More specifically, in the third embodiment, the processing assignments of the data flows A and C have been determined, and a processing assignment is to be executed for the data flow B.

At this time, a total setting change count necessary for setting changes of the PEs 202-1 to 202-4 from the data flow A to the data flow B and from the data flow B to the data flow C is focused. By calculating the total count as an evaluated value denoted by reference numeral S1308 of FIG. 13 in the first embodiment, the setting change count in reconstructing the reconfigurable device is decreased.

Note that reference numerals 1512, 1514, 1516, and 1518 denote setting changes of the PEs 202-1 to 202-4 between the data flows A and B, respectively. Reference numerals 1513, 1515, 1517, and 1519 denote setting changes of the PEs 202-1 to 202-4 between the data flows B and C, respectively. The third embodiment is different from the first embodiment in that, to execute a processing assignment for one data flow, a plurality of other data flows having undergone a processing assignment are simultaneously referred to.

A processing assignment in step S1303 of FIG. 13 is executed for the data flow 1510 as a processing assignment target. The data flows 1509 and 1511 have undergone a processing assignment, and no processing assignment change is made. With respect to a setting change count used in step S1306 of FIG. 13, there is the following difference as compared with the first embodiment.

If a setting value $u_{i0,j,k}$ in a data flow i0 having undergone a processing assignment is not equal to a setting value $u_{i1,j,k}$ at the same address in a data flow i1 as a processing assignment target, $\alpha_3$ is added to the setting change count. If the setting value $u_{i1,j,k}$ in the data flow i1 as a processing assignment target is not equal to a setting value $u_{i2,j,k}$ at the same address in a data flow i2 having undergone a processing assignment, $\beta_3$ is added to the setting change count. If the setting values are equal to each other, no addition operation is executed. The above computation is executed for all memories k of all processing elements j. The setting change count described above can be represented by $$\text{setting change count} = \quad (6)$$
$$s = \sum_{j,k} \begin{cases} \alpha_3 & \text{if } (u_{i0,j,k} \neq u_{i1,j,k}) \\ 0 & \text{otherwise} \end{cases} + \sum_{i,j} \begin{cases} \beta_3 & \text{if } (u_{i1,j,k} \neq u_{i2,j,k}) \\ 0 & \text{otherwise} \end{cases}$$

where i0 indicates the data flow A 1509, i1 indicates the data flow B 1510, and i2 indicates the data flow C 1511. Of these setting values, the setting values $u_{i0,j,k}$ and $u_{i2,j,k}$ have undergone a processing assignment, and the setting value $u_{i1,j,k}$ is decided so that the value represented by the above equation becomes small. Furthermore, $\alpha_3$ and $\beta_3$ are generally 1. It is, however, possible to change the weights for each address at which a setting is stored depending on the structure of the configuration memory of the processing element. It is also possible to assign the weights for each data flow to assign priority to the switching time for each data flow. If a new data flow is inserted, it is possible to obtain the effect of decreasing the setting change count with respect to data flows before and after insertion.

Fourth Embodiment

Figure 16:
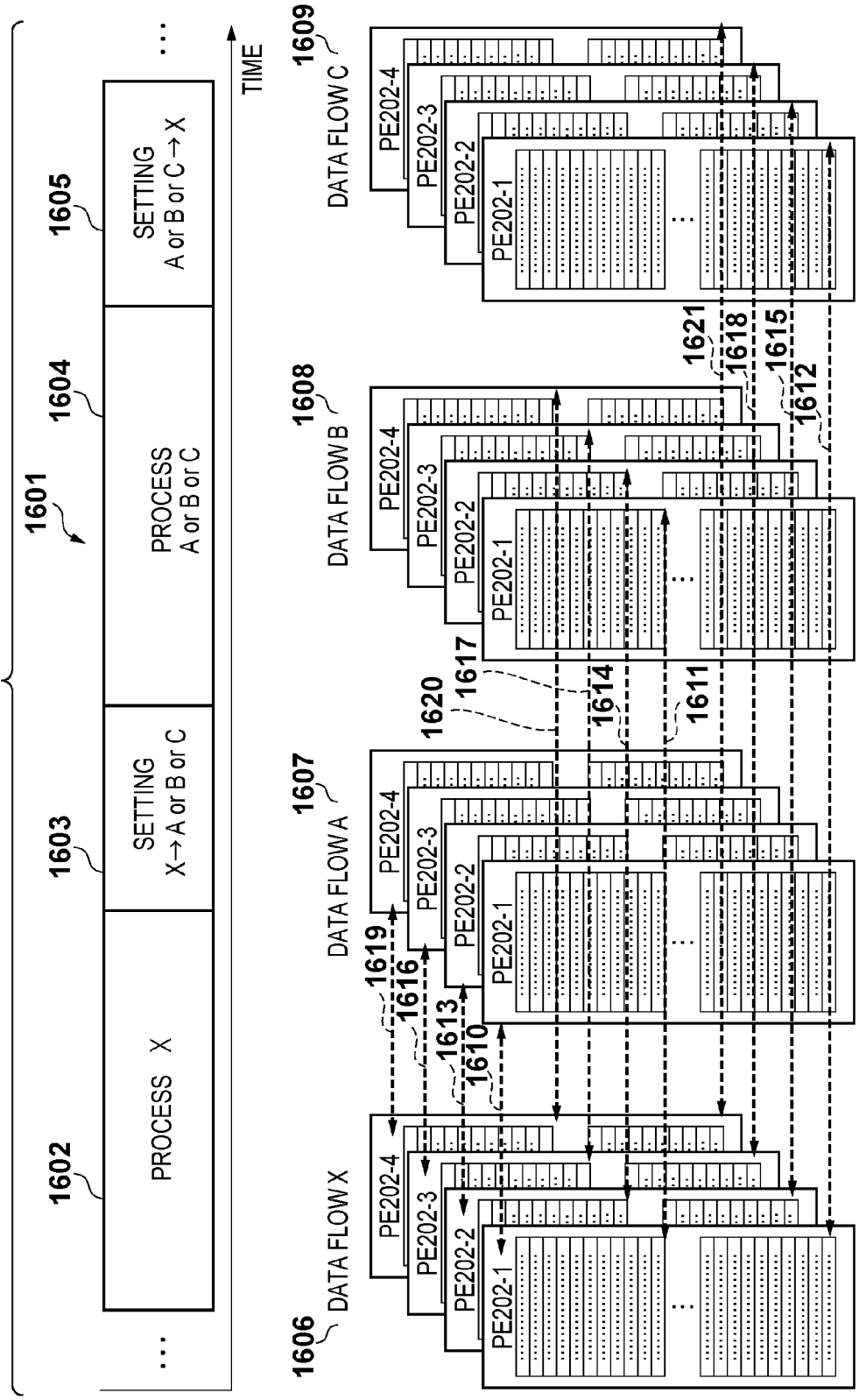
FIG. 16 is a view showing an overview for executing the processing assignment of data flows according to the fourth embodiment.

The fourth embodiment of the present invention will be described. FIG. 16 shows a time chart of processes and an overview of a processing assignment according to the fourth embodiment. The fourth embodiment relates to a processing assignment when, after the processing of a data flow as a reference, a data flow to be executed next changes depending on a processing result.

In a time chart 1601 shown in FIG. 16, the processing of a data flow X as a reference is executed during a period 1602, and a setting change is made from the data flow X to a data flow A, B, or C depending on a processing result during a period 1603. After the setting operation is completed, the processing of the data flow A, B, or C is executed during a period 1604, and a setting change is made from the data flow A, B, or C to the data flow X during a period 1605 for re-executing the processing of the data flow X as a reference. Although the above execution order is repeated, which one of the data flows A, B, and C is to be executed is determined based on the result of the data flow X.

In FIG. 16, reference numerals 1606, 1607, 1608, and 1609 denote settings of PEs 202-1 to 202-4 in the data flows X, A, B, and C, respectively. In the fourth embodiment, a processing assignment is executed for all the data flows X, A, B and C. As in the first embodiment, the settings 1606, 1607, 1608, and 1609 correspond to settings shown in FIG. 6. More specifically, in the fourth embodiment, a processing assignment is executed for the data flows X, A, B, and C.

To execute a processing assignment, a total setting change count, in the PEs 202-1 to 202-4, necessary for data flow changes between the data flows X and A, X and B, and X and C is considered. By calculating the total count as an evaluated value denoted by reference numeral S1304 of FIG. 13 in the first embodiment, the setting change count in reconstructing a reconfigurable device is decreased. Note that reference numerals 1610, 1613, 1616, and 1619 denote setting changes of the PEs 202-1 to 202-4 between the data flows X and A, respectively. Reference numerals 1611, 1614, 1617, and 1620 denote setting changes of the PEs 202-1 to 202-4 between the data flows X and B, respectively. Reference numerals 1612, 1615, 1618, and 1621 denote setting changes of the PEs 202-1 to 202-4 between the data flows X and C, respectively. This embodiment is different from the first embodiment in that there is a branch in the execution order, and a processing assignment is executed for data flows as branch destinations and a data flow as a branch source.

In step S1301 of FIG. 13, while a plurality of data flows are input, a partially arbitrary execution order is input. A processing assignment in step S1303 of FIG. 13 is executed for all the data flows 1606, 1607, 1608, and 1609 as processing assignment targets. Although a case in which all the data flows are handled as processing assignment targets has been explained in the fourth embodiment, the present invention is not limited to this. The fourth embodiment focuses on the execution order of data flows. If at least one data flow has undergone a processing assignment, a processing assignment is executed for other data flows.

With respect to a setting change count used in step S1306 of FIG. 13, there is the following difference as compared with the first embodiment. If a setting value $u_{i0,j,k}$ in a data flow i0 as a processing assignment target is not equal to a setting value $u_{i1,j,k}$ at the same address in a data flow i1 as a processing assignment target, $\alpha_4$ is added to the setting change count. If the setting value $u_{i0,j,k}$ in the data flow i0 as a processing assignment target is not equal to a setting value $u_{i2,j,k}$ at the same address in a data flow i2 as a processing assignment target, $\beta_4$ is added to the setting change count. Furthermore, if the setting value $u_{i0,j,k}$ in the data flow i0 as a processing assignment target is not equal to a setting value $u_{i3,j,k}$ at the same address in a data flow i3 as a processing assignment target, $\gamma_4$ is added to the setting change count. Alternatively, if the setting values are equal to each other, no addition operation is executed. The above computation is executed for all memories k of all processing elements j. This can be represented by $$\text{setting change count} = \tag{7}$$
$$s = \sum_{i,j} \begin{cases} \alpha_4 & \text{if } (u_{i0,j,k} \neq u_{i1,j,k}) \\ 0 & \text{otherwise} \end{cases} + \sum_{i,j} \begin{cases} \beta_4 & \text{if } (u_{i1,j,k} \neq u_{i2,j,k}) \\ 0 & \text{otherwise} \end{cases} +$$
$$\sum_{i,j} \begin{cases} \gamma_4 & \text{if } (u_{i0,j,k} \neq u_{i3,j,k}) \\ 0 & \text{otherwise} \end{cases}$$

where i0 indicates the data flow X 1606, i1 indicates the data flow A 1607, i2 indicates the data flow B 1608, and i3 indicates the data flow A 1609. The setting values $u_{i0,j,k}$, $u_{i1,j,k}$, $u_{i2,j,k}$, and $u_{i3,j,k}$ are decided so that the value represented by the above equation becomes small. Furthermore, $\alpha_4$, $\beta_4$, and $\gamma_4$ are generally 1. It is, however, possible to change the weights for each address at which a setting is stored depending on the structure of the configuration memory of the processing element. It is also possible to assign the weights for each data flow to assign priority to the switching time for each data flow.

According to the fourth embodiment, even if there is a branch in an execution order when sequentially executing a plurality of data flows, it is possible to obtain the effect of decreasing the setting change count by considering a data flow as a branch source and a plurality of other data flows as branch destinations.

Although a routing method has been described for each use case in the above-described embodiments, a combination of the methods may be used in the present invention. Furthermore, although a processing element has been described as a structure element of a reconfigurable device, the present invention is not limited to this and an LUT or a combination of an LUT and a processing element may be used. Settings are not limited to those described in the embodiments, and settings used in an LUT-based reconfigurable device may be available. Although all input data flows are considered as processing assignment targets in the embodiments, a processing assignment may be executed for some of the data flows by specifying a processing assignment range. Furthermore, although the number of processing elements is constant for data flows in the embodiments, the number of processing elements to which processes are assigned may be different.

Fifth Embodiment

In the fifth and subsequent embodiments, in addition to shortening a circuit configuration change period like the first to fourth embodiments, processing elements having a data input/output relation are made closer to each other, thereby shortening a total processing period as a result.

Figure 17:
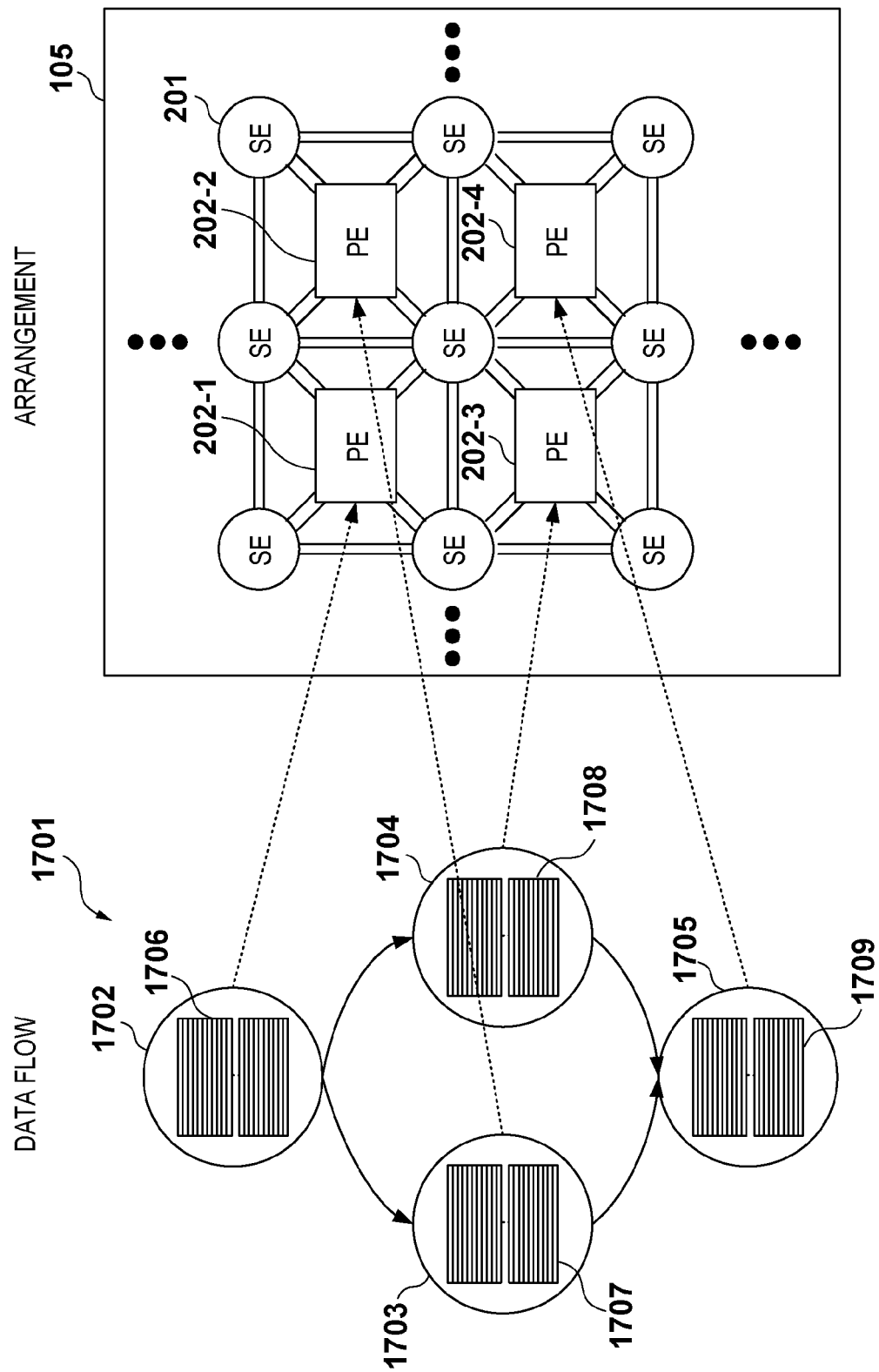
FIG. 17 is a view showing an arrangement example of the processes of a data flow in processing elements according to the fifth embodiment.

An overview of the arrangement of a data flow in structure elements will be described with reference to FIG. 17. The arrangement indicates that a processing element, which is defined at a predetermined location, for executing each process of the data flow is determined. Referring to FIG. 17, a node 1702, 1703, 1704, or 1705 of a data flow 1701 indicates a process executed in one processing element. The processes corresponding to the nodes 1702, 1703, 1704, and 1705 are arranged in processing elements 202-1, 202-2, 202-3, and 202-4 of a reconfigurable device 105, respectively. Settings 1706, 1707, 1708, or 1709 include an address 601 and a setting value 602 corresponding to processing contents of the node 1702, 1703, 1704, or 1705. Assume that processing contents executed in each node have been assigned, and the settings 1706, 1707, 1708, or 1709 have been determined. Determining the arrangement makes it possible to determine an ID 503 corresponding to a processing element to which the settings are written.

A time chart for implementing desired processing by changing a plurality of types of configurations of the above-described reconfigurable device is as shown in FIG. 10. FIG. 10 is a time chart in which one reconfigurable device sequentially executes a plurality of different data flows A to Z. A data flow handled in this embodiment is formed by a unit which can be arranged in the processing elements of the reconfigurable device. Settings for processing each data flow are generated in advance. The reconfigurable device is reconstructed based on the settings generated in advance for itself, and processing is executed with the configuration. The processes are executed for the data flows in a predetermined sequence.

Assume that the data flow A has been arranged and the data flow B is to be arranged. More specifically, setting values for executing the data flow A which has been arranged are referred to, and then the processing arrangement of the data flow B is determined. After determining the processing arrangement of the data flow B by referring to the processing arrangement of the data flow A, it is considered that the data flow B has been arranged and the data flow C is to be arranged. More specifically, similarly to determination of the processing arrangement of the data flow B, setting values for executing the data flow B having undergone a processing arrangement are referred to, and then the processing arrangement of the data flow C is determined. Repeating the above procedure enables to arrange the data flows A to Z. In general, the solution space of an arrangement problem even for determining only arrangements is wide. If, therefore, detailed routing is simultaneously determined, it becomes impossible to calculate not only a good solution but also a solution itself. In the arrangement method, detailed routing information is not determined, and an arrangement is determined using approximate distances based on an arrangement model shown in FIG. 18. In the fifth embodiment, a Manhattan model based on the positions of the processing elements of a processing element array is used as an arrangement model. A solution is calculated by considering the Manhattan distance between processing elements as an index. Note that the approximate distance is not limited to the Manhattan distance in the present invention. As an index, it is possible to simultaneously execute detailed routing. Although an arrangement model based on the Manhattan model is used in this embodiment, the present invention is not limited to this. A model depending on architecture or a model based on the Euclidean space may be used.

Figure 18:
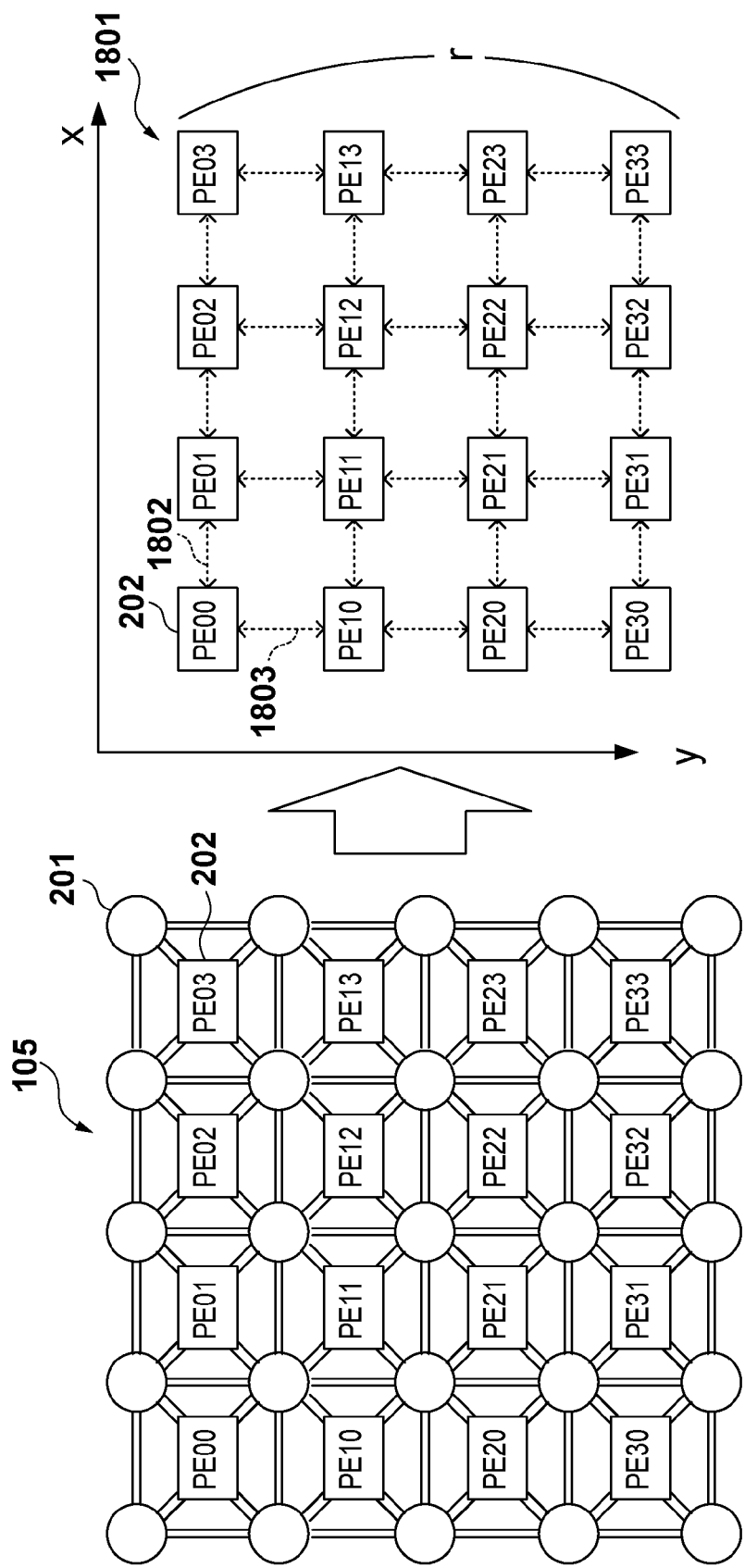
FIG. 18 is a view showing a model example of a processing element array for a processing arrangement according to the fifth embodiment.

As shown in FIG. 18, an arrangement model 1801 is defined for the reconfigurable device 105 including switching elements 201 and processing elements 202. The arrangement model 1801 is formed by only the processing elements 202. A distance as an index is represented by a distance 1802 between processing elements in the horizontal direction and a distance 1803 between the processing elements in the vertical direction. In the fifth embodiment, the distances in the horizontal and vertical directions are equal to each other but they may be different from each other. Although a distance handled in the present invention may be a physical length or a period of time required for communication between elements, the present invention is not limited to them.

A method of arranging processes in the processing elements, which focuses on processing switching shown in the time chart of FIG. 10 will be described using the arrangement model of FIG. 18.

Figure 19:
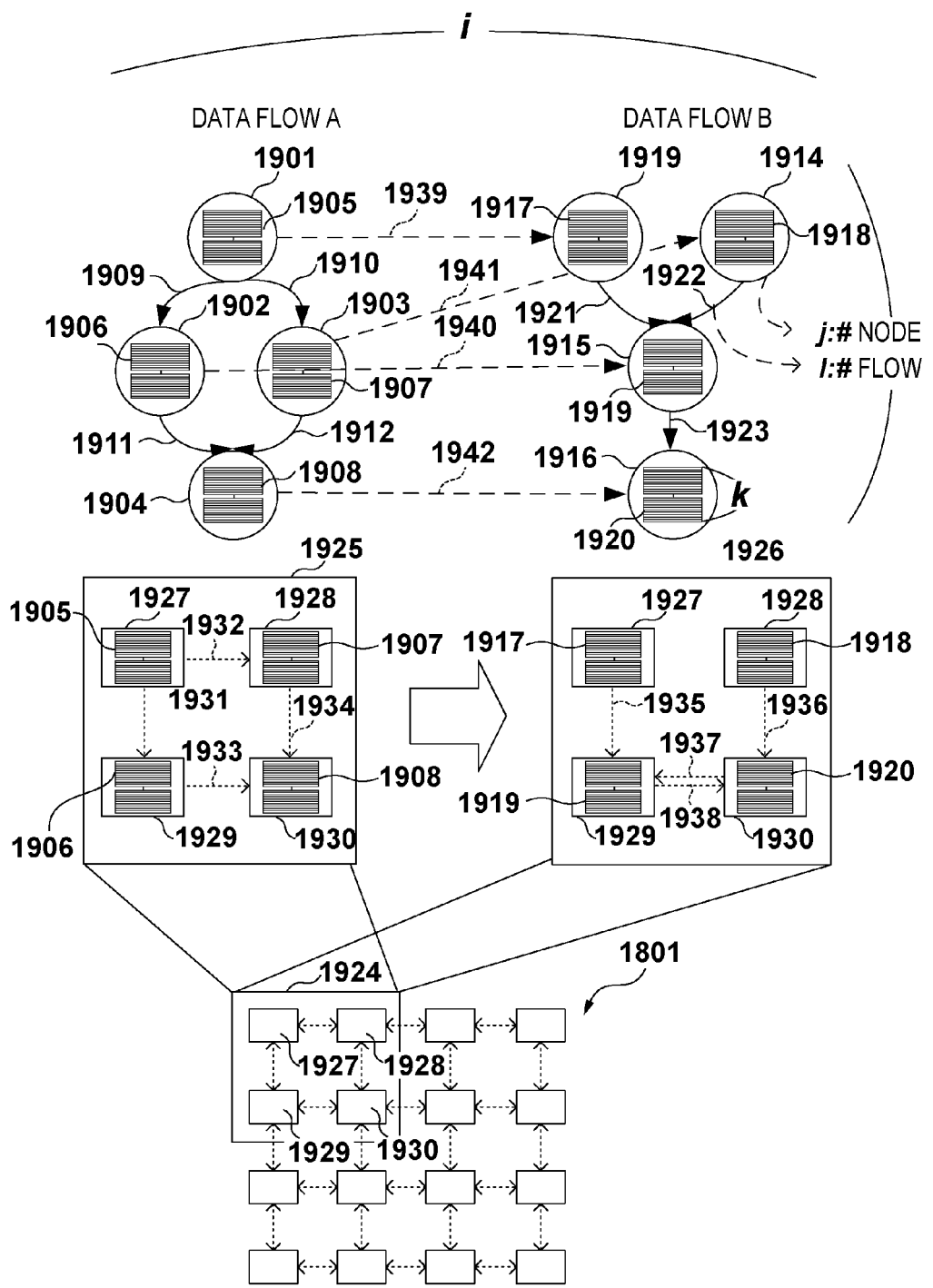
FIG. 19 is a view showing an overview for executing the processing arrangement of a plurality of data flows according to the fifth embodiment.

FIG. 19 shows an overview of an arrangement according to the fifth embodiment. The data flow A is formed by processes represented as nodes 1901, 1902, 1903, and 1904, and settings 1905, 1906, 1907, or 1908 indicate the settings of a process executed in each node. A flow 1909 represents the data input/output relation between the nodes 1901 and 1902. A flow 1910 represents the data input/output relation between the nodes 1901 and 1903. A flow 1911 represents the data input/output relation between the nodes 1902 and 1904. A flow 1912 represents the data input/output relation between the nodes 1903 and 1904.

The data flow B is formed by processes represented as nodes 1913, 1914, 1915, and 1916, and settings 1917, 1918, 1919, or 1920 indicate the settings of a process executed in each node. A flow 1921 represents the data input/output relation between the nodes 1913 and 1915. A flow 1922 represents the data input/output relation between the nodes 1914 and 1915. A flow 1923 represents the data input/output relation between the nodes 1915 and 1916.

Assume that the processes of the data flows A and B are arranged in a region 1924 within the arrangement model 1801 of the processing element array. Although an arrangement in part of the processing element array will be described in the fifth embodiment, the present invention is not limited to this. An arrangement in a plurality of parts or the whole array may be possible. Reference numeral 1925 denotes a processing arrangement in the region 1924 for the data flow A; and 1926, a processing arrangement in the region 1924 for the data flow B. Processing elements 1927, 1928, 1929, and 1930 within the processing arrangement 1925 or 1926 indicate physically identical processing elements. In the processing arrangement 1925, the process of the node 1901 of the data flow A is arranged in the processing element 1927. The process of the node 1902 is arranged in the processing element 1929. The process of the node 1903 is arranged in the processing element 1928. The process of the node 1904 is arranged in the processing element 1930. Distances 1931, 1932, 1933, and 1934 represent the data communication distances of the flows 1909, 1910, 1911, and 1912 between the processing elements, respectively.

For the data flow B, the process of the node 1913 is arranged in the processing element 1927. The process of the node 1914 is arranged in the processing element 1928. The process of the node 1915 is arranged in the processing element 1929. The process of the node 1916 is arranged in the processing element 1930. Distance 1935 represents the data communication distance of the flow 1921 between the processing elements, distances 1936 and 1937 represent the data communication distance of the flow 1922, and a distance 1938 represents the data communication distance of the flow 1923.

When processing is switched from the data flow A to the data flow B, settings are changed from the settings 1905 to the settings 1917 in the processing element 1927 as indicated by a setting change 1939. In the processing element 1928, settings are changed from the settings 1907 to the settings 1918 as indicated by a setting change 1941. In the processing element 1929, settings are changed from the settings 1906 to the settings 1919 as indicated by a setting change 1940. In the processing element 1930, settings are changed from the settings 1908 to the settings 1920 as indicated by a setting change 1942.

In the fifth embodiment, to execute an arrangement, two factors, that is, a setting change count when processing is switched, and the distance between structure elements based on the dependency relation between data flows are considered.

In the example shown in FIG. 19 used in the fifth embodiment, the data flow A has undergone a processing arrangement, and setting values associated with the data flow A within the memory of each processing element are fixed values. The data flow B is a processing arrangement target. That is, assume that the processing sequence of the data flows has been determined, and the arrangement of the data flow to be processed next is determined based on the arrangement information of the data flow having undergone an arrangement.

A procedure for implementing the present invention will be described with reference to a flowchart shown in FIG. 20. The procedure indicates a processing arrangement method based on simulated annealing. The present invention, however, is not limited to this. Various approximate solutions such as genetic algorithms and numerical optimization methods such as linear programming and non-linear programming may be used. A method may be changed depending on the scale of an arrangement problem.

Let i be an index indicating each data flow shown in FIG. 19, j be the index of a node, and k be a configuration address of a memory within an element, which corresponds to the address 601 of FIG. 6 or an address 901 of FIG. 9. Furthermore, let 1 be an index associated with a flow between the nodes j. Then, $u_{i,j,k}$ can represent a setting value within each memory. Also, $S_{i,l}$ represents a node on the starting side of the flow l in the ith data flow, and $d_{i,l}$ represents a node on the arriving side of the flow 1.

As shown in FIG. 18, let r be an index indicating each processing element. The arrangement position of each node j of each data flow i can be represented by $x_{i,j}$ and $y_{i,j}$. In this embodiment, since different processes within one data flow are not arranged in one processing element, $x_{i,j}$ and $y_{i,j}$ are certainly different for each node j. That is, different processes are not arranged in one processing element.

Assume that a data flow i0 has undergone a processing arrangement, and a data flow i1 is a processing arrangement target. In step S2001, a plurality of data flows and the sequence relation (the sequence of i) between them are input. For a data flow having undergone a processing arrangement, arrangement information $x_{i0,j}$, $y_{i0,j}$ is input together with a setting value $u_{i0,j,k}$.

In step S2002, required specifications and hardware constraints are input. The hardware constraints include constraints of a hardware configuration such as configuration information individually held by each processing element with a heterostructure, and heat generated by processing. The required specifications include items which should be limited in use of hardware such as the distance between processing elements, and the level of priority assigned to a setting change count or a distance (to be described later in step S2006). Note that the present invention is not limited to the above-described constraints.

In step S2003, a processing arrangement is executed for a target data flow. As an initial processing arrangement method, a method of randomly arranging processes, or a method of arranging processes in the depth direction of the data flow in association with the input and output directions of a processing element array is used. The present invention, however, is not limited to them. Except in an initial arrangement, the processing arrangement is changed based on simulated annealing. In the fifth embodiment, an initial processing arrangement or a processing arrangement change is executed for the data flow B as a processing arrangement target. For the data flow A having undergone a processing arrangement, the processing arrangement is not changed according to the constraints.

In step S2004, it is determined whether a processing arrangement result satisfies the required specifications input in step S2002. As represented by equation (1), if the constraints are satisfied, 0 is set in a penalty variable $p_0$; otherwise, a penalty value $C_{p0}$ is set in the penalty variable $p_0$ (see equation (1)).

In the fifth embodiment, if constraints are violated, $C_{p0}$ is considered as a constant. However, $C_{p0}$ may be a variable value according to a violated item. In step S2005, it is determined whether the processing arrangement result satisfies the hardware constraints input in step S2002.

As represented by equation (2), if the constraints are satisfied, 0 is set in a penalty variable $P_1$; otherwise, a penalty value $C_{p1}$ is set in the penalty variable $P_1$.

In the fifth embodiment, if constraints are violated, $C_{p1}$ is considered as a constant. However, $C_{p1}$ may be a variable value according to a violated item. In step S2006, the setting change count when the target data flow is changed and a distance based on the arrangement are calculated, thereby computing an evaluated value. The calculation of the setting change count will be described first. Referring to the example shown in FIG. 19, the count to be calculated indicates the number of settings which need to be changed in the setting changes 1939, 1940, 1941, and 1942.

More specifically, if the setting value $u_{i0,j,k}$ in the data flow i0 having undergone a processing arrangement is not equal to the same type of setting value $u_{i1,j,k}$ of a processing element arranged at the same position in the data flow i1 as a processing arrangement target, $\alpha_1$ is added to the setting change count; otherwise, no addition operation is executed.

Note that $j0_r$ represents a node j0 of the data flow i0 arranged in a processing element r and $j1_r$ represents a node j1 of the data flow i1 where r represents an index indicating each processing element, as described above. The setting change count necessary for changing the processing contents of a node arranged at the same position when a data flow is switched is obtained by $$\text{setting change count} = s = \sum_{r,k} \begin{cases} \alpha_1 & \text{if } (u_{i0,j0,k} \neq u_{i1,j1,k}) \\ 0 & \text{otherwise} \end{cases} \quad (8)$$

where $\alpha_1$ is generally 1. It is, however, possible to change the weight for each address at which a setting is stored depending on the structure of the configuration memory of the processing element. It is also possible to assign the weight for each data flow to assign priority to the switching time for each data flow. As shown in FIG. 7, it is possible to change one setting value for one configuration command. If, therefore, the number of commands decreases, it is possible to shorten a processing switching time.

Calculation of a distance will be described next. The distance indicates the total of the distances 1935, 1936, 1937, and 1938 in the data flow B as an arrangement target. Based on the data input/output relation of the data flow and the arrangement in step S2003, it is possible to represent the distance by $$\text{distance} = d = \sum_1 \left( \kappa 1_1 \cdot |x_{i1,si1,1} - x_{i1,di1,1}| + \lambda 1_1 \cdot |y_{i1,si1,1} - y_{i1,di1,1}| \right) \quad (9)$$

where $\kappa 1_1$ and $\lambda 1_1$ represent weights for x and y of the distance between nodes, respectively. It is possible to make the weights constant or to individually change the weights depending on architecture such as the distance between nodes. Using the above equation, an evaluated value is calculated in this step according to $$\text{evaluated value} = \delta \cdot s + (1-\delta)d + p0 + p1 \quad (10)$$

where $\delta$ represents an index indicating the level of priority assigned to the distance or the setting change count given in step S2002. That is, as the distance is shorter and the setting change count necessary for reconstruction is smaller while satisfying the required specifications and hardware constraints, the evaluated value becomes smaller.

Finally, it is determined based on simulated annealing in step S2007 whether a target has been reached. If the target has been reached, the process ends; otherwise, the process returns to step S2003 to repeat steps S2003 to S2007. This means that the process is repeated until a sufficiently good result is obtained or a scheduled computation time has elapsed.

Since a method of arranging the processes of a data flow in processing elements in a general reconfigurable device does not consider a setting change count, it is necessary to change all settings when the processing of the data flow is changed.

In the fifth embodiment, the processing sequence of data flows is focused. Decreasing the total setting change count in addition to the distance enables to effectively decrease the setting change count.

Sixth Embodiment

Figure 21:
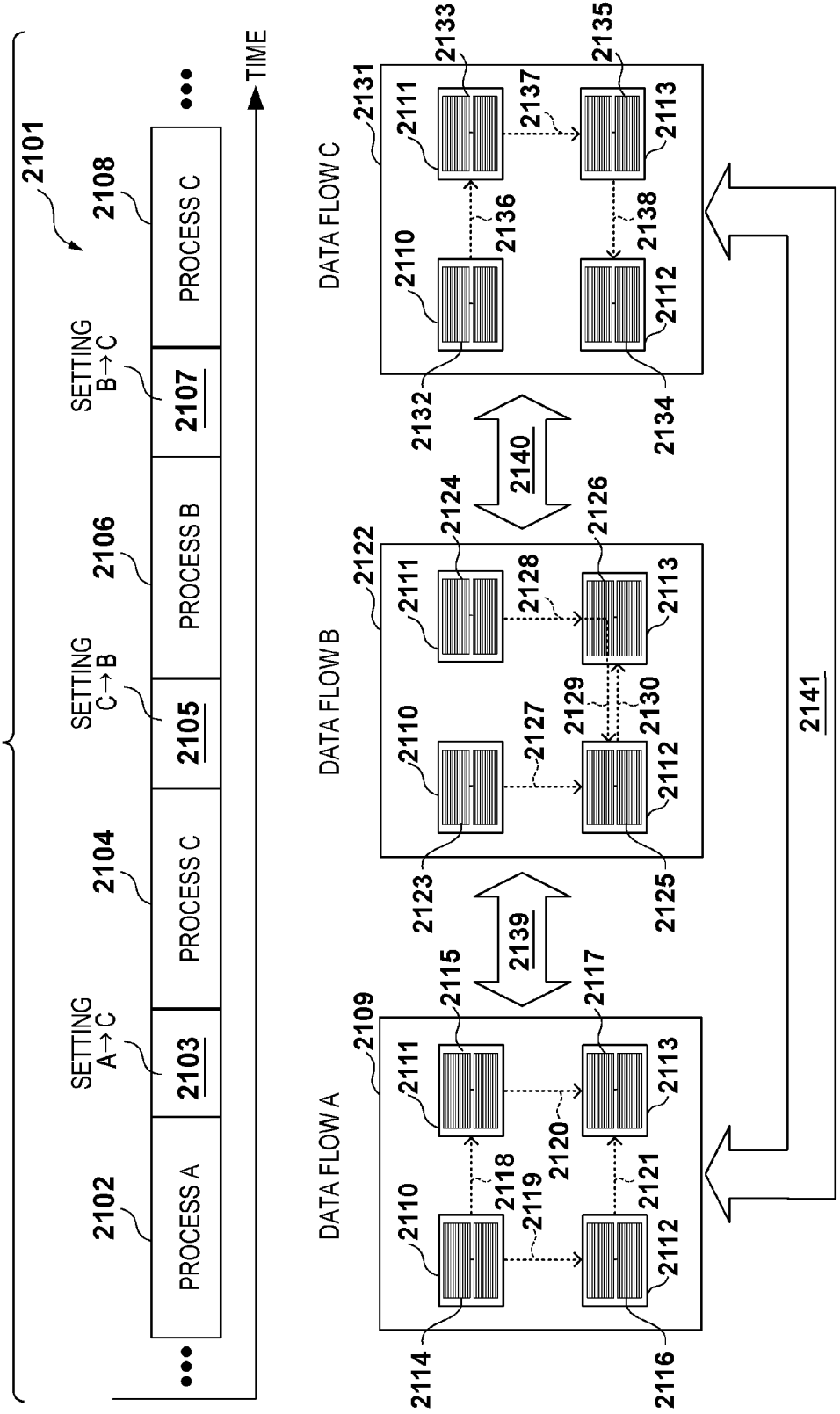
FIG. 21 is a view showing an overview for executing the processing arrangement of data flows according to the sixth embodiment.

The sixth embodiment of the present invention will be described. FIG. 21 shows a time chart of processes and an overview of a processing arrangement according to the sixth embodiment. The sixth embodiment relates to a processing arrangement when, in changing the settings of a reconfigurable device, the processing contents of each data flow have been determined but the change sequence of the processing contents is uncertain and changes depending on the situation or input data.

During a period 2102 in a time chart 2101, processing associated with a data flow A is executed. During periods 2104 and 2108, processing associated with a data flow C is executed. During a period 2106, processing associated with a data flow B is executed. During a period 2103, a setting change is made from the data flow A to the data flow C. During a period 2105, a setting change is made from the data flow C to the data flow B. During a period 2107, a setting change is made from the data flow B to the data flow C. In this embodiment, since the processing change sequence of the data flows A, B, and C is not always the same, it is necessary to execute a processing arrangement in consideration of all the setting changes between the data flows.

In FIG. 21, reference numerals 2109, 2122, and 2131 denote arrangements of processing elements in the data flows A, B, and C, respectively, and a processing arrangement is collectively executed for all the data flows at once. Note that processing elements 2110, 2111, 2112, and 2113 in the arrangement 2109, 2122, or 2131 indicate physically identical processing elements.

Settings 2114, 2115, 2116, and 2117 indicate the settings of the processing elements 2110, 2111, 2112, and 2113 in the arrangement of the data flow A, respectively. Settings 2123, 2124, 2125, and 2126 indicate the settings of the processing elements 2110, 2111, 2112, and 2113 in the arrangement of the data flow B, respectively. Settings 2132, 2133, 2134, and 2135 indicate the settings of the processing elements 2110, 2111, 2112, and 2113 in the arrangement of the data flow C, respectively. The settings correspond to those described in FIG. 6 as in the first embodiment. This embodiment focuses on a total setting change count, in the processing elements 2110, 2111, 2112, and 2113, necessary for data flow changes between the data flows A and B, B and C, and C and A, and the total distance of the connections between the processing elements.

By calculating, as an evaluated value (to be described later), the setting change count added to an evaluated value in step S2006 of the flowchart shown in FIG. 20 based on the above total count and distance, the setting change count in reconstructing a reconfigurable device is decreased in consideration of the distance.

Reference numeral 2139 denotes a setting change for the processing elements 2110, 2111, 2112, and 2113 between the data flows A and B; 2140, a setting change for the processing elements 2110, 2111, 2112, and 2113 between the data flows B and C; and 2141, a setting change for the processing elements 2110, 2111, 2112, and 2113 between the data flows C and A.

The sixth embodiment is different from the first embodiment in that a processing arrangement is simultaneously executed for a plurality of data flows. In step S2001 of FIG. 20, a plurality of data flows are input, and information indicating that an processing sequence is arbitrary is input. In a processing arrangement in step S2003 of FIG. 20, a processing arrangement is executed for all the data flows A, B, and C as processing arrangement targets. With respect to the processing in step S2006 of FIG. 20, there is the following difference as compared with the fifth embodiment.

If a setting value $u_{i0,j,k}$ in a data flow i0 as a processing arrangement target is not equal to the same type of setting value $u_{i1,j,k}$ of a processing element arranged at the same position in a data flow i1 as a processing arrangement target, $\alpha_2$ is added to the setting change count. If the setting value $u_{i1,j,k}$ in the data flow i1 as a processing arrangement target is not equal to the same type of setting value $u_{i2,j,k}$ of a processing element arranged at the same position in a data flow i2 as a processing arrangement target, $\beta_2$ is added to the setting change count. Furthermore, if the setting value $u_{i2,j,k}$ in the data flow i2 as a processing arrangement target is not equal to the same type of setting value $u_{i0,j,k}$ of a processing element arranged at the same position in the data flow i0 as a processing arrangement target, $\gamma_2$ is added to the setting change count. Alternatively, if the setting values are equal to each other, no addition operation is executed.

Note that $j0_r$ represents a node j0 of the data flow i0 arranged in a processing element r, $j1_r$ represents a node j1 of the data flow i1, and $j2_r$ represents a node j2 of the data flow i2 where r represents an index indicating each processing element, as described above.

The setting change count necessary for changing the processing contents of a node arranged at the same position when a data flow is switched is obtained by $$\text{setting change count} = s = \sum_{r,k} \begin{cases} \alpha_2 & \text{if } (u_{i0,j0_r,k} \neq u_{i1,j1_r,k}) \\ 0 & \text{otherwise} \end{cases} + \quad (11)$$

-continued $$\sum_{r,k} \begin{cases} \beta_2 & \text{if } (u_{i1,j1_r,k} \neq u_{i2,j2_r,k}) \\ 0 & \text{otherwise} \end{cases} +$$

$$\sum_{r,k} \begin{cases} \gamma_2 & \text{if } (u_{i2,j2_r,k} \neq u_{i0,j0_r,k}) \\ 0 & \text{otherwise} \end{cases}$$

where $\alpha_2$, $\beta_2$, and $\gamma_2$ are generally 1. It is, however, possible to change the weights for each address at which a setting is stored depending on the structure of the configuration memory of the processing element. It is also possible to assign the weights for each data flow to assign priority to the switching time for each data flow.

With respect to a distance, there is the following difference. In the example shown in FIG. 21, the distance is represented as the total of distances 2118, 2119, 2120, 2121, 2127, 2128, 2129, 2130, 2136, 2137, and 2138. The arrangements of the processing elements in FIG. 21 are merely examples, and the total distance changes by changing the arrangements. After the arrangement operation, it is possible to represent the distance based on the arrangement and the data input/output of a data flow using $$\text{distance} = d = \sum_{i,l} \left( \kappa 2_{i,1} \cdot |x_{i,s_{i,1}} - x_{i,d_{i,1}}| + \lambda 2_{i,1} \cdot |y_{i,s_{i,1}} - y_{i,d_{i,1}}| \right) \quad (12)$$

where $\kappa 2_{i,1}$ and $\lambda 2_{i,1}$ represent weights which can be made constant or can be individually changed depending on architecture such as the distance between nodes of each data flow. According to the sixth embodiment, by considering all the data flows, it is possible to obtain the effect of decreasing the setting change count on average in consideration of the distance even if a processing execution order is uncertain.

Seventh Embodiment

Figure 22:
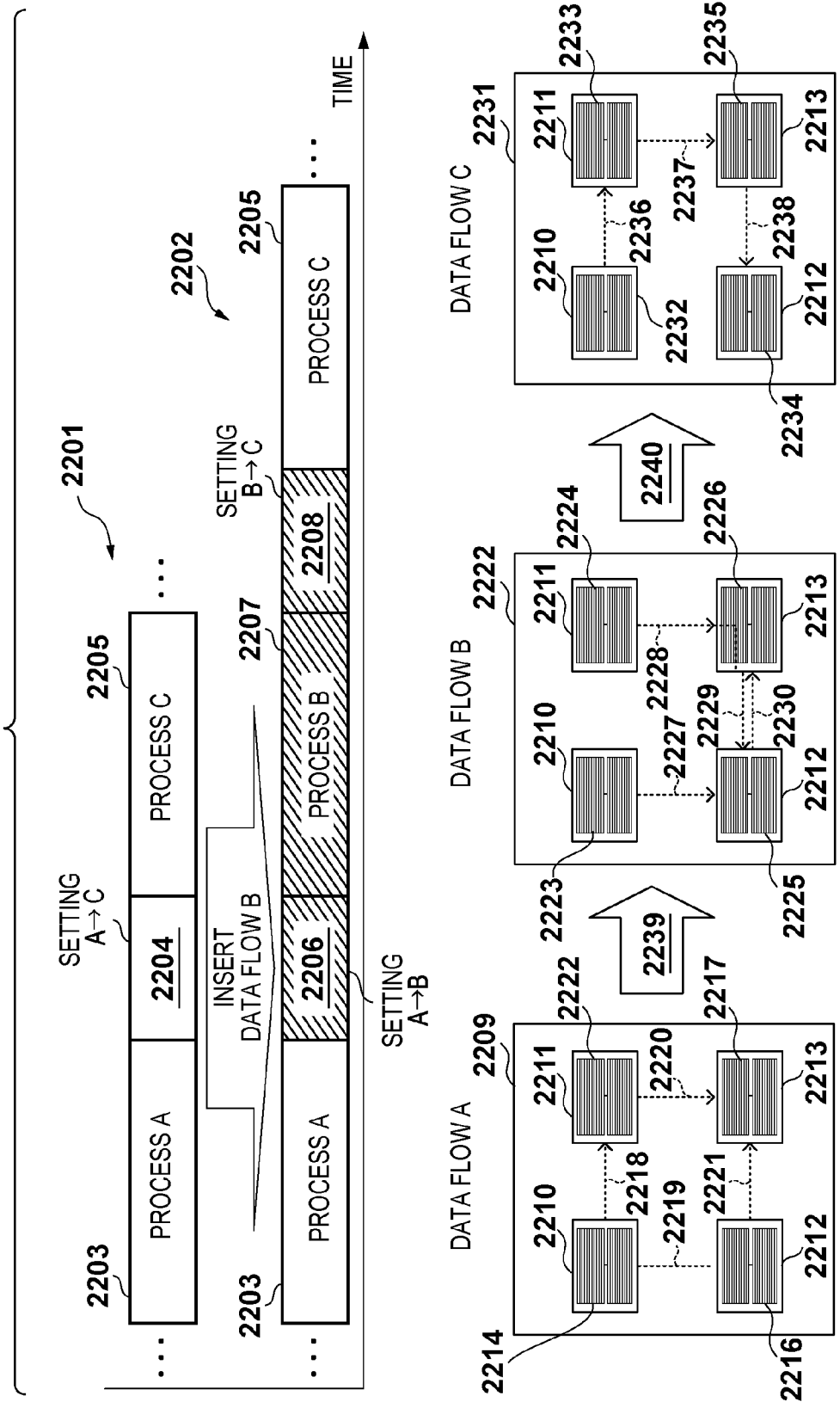
FIG. 22 is a view showing an overview for executing the processing arrangement of data flows according to the seventh embodiment.

The seventh embodiment of the present invention will be described. FIG. 22 shows a time chart of processes and an overview of a processing arrangement according to the seventh embodiment. The seventh embodiment assumes a case in which the processing sequence of a plurality of data flows and the processing arrangement of each data flow have already been determined. The seventh embodiment relates to a processing arrangement for inserting processing corresponding to a new data flow between the processes of arbitrary data flows in the above processing sequence without changing the processing assignments before and after insertion.

For a time chart 2201 shown in FIG. 22, a processing sequence in a reconfigurable device and a processing arrangement have already been determined. In the time chart 2201, after processing 2203 of a data flow A, a period 2204 during which the settings of the data flow A are changed to the settings of a data flow C is inserted, and then processing 2205 of the data flow C is executed. A time chart 2202 is obtained by newly inserting a data flow B between the data flows A and C in the time chart 2201. After the processing 2203 of the data flow A, a period 2206 during which the settings of the data flow A are changed to the settings of the data flow B is inserted, and then processing 2207 of the newly inserted data flow B is executed. Then, after a period 2208 during which the settings of the data flow B are changed to the settings of the data flow C, the processing 2205 of the data flow B is executed. Since the processing arrangement of the data flow B is determined without changing the processing arrangements of the data flows A and C at this time, a setting change amount between the data flows before and after insertion which have undergone a processing arrangement is considered.

In FIG. 22, reference numerals 2209, 2222, and 2231 denote arrangements of the processing elements of the data flows A, B, and C, respectively. In this embodiment, the data flows A and C have undergone a processing arrangement, and a processing arrangement is executed for the data flow B. Note that processing elements 2210, 2211, 2212, and 2213 in the arrangement 2209, 2222, or 2231 indicate identical processing elements.

Settings 2214, 2215, 2216, and 2217 indicate the settings of the processing elements 2210, 2211, 2212, and 2213 in the arrangement of the data flow A, respectively. Settings 2223, 2224, 2225, and 2226 indicate the settings of the processing elements 2210, 2211, 2212, and 2213 in the arrangement of the data flow B, respectively. Settings 2232, 2233, 2234, and 2235 indicate the settings of the processing elements 2210, 2211, 2212, and 2213 in the arrangement of the data flow C, respectively. The settings correspond to those described in FIG. 6 as in the first embodiment. The seventh embodiment focuses on a total setting change count, in the processing elements 2210, 2211, 2212, and 2213, necessary for data flow changes between the data flows A and B, B and C, and C and A, and the total distance of the connections between the processing elements.

Note that reference numeral 2239 denotes a setting change for the processing elements 2210, 2211, 2212, and 2213 between the data flows A and B when newly inserting the data flow B. Reference numeral 2240 denotes a setting change for the processing elements 2210, 2211, 2212, and 2213 between the data flows B and C.

The seventh embodiment is different from the fifth embodiment in that the processing arrangement of a target data flow is executed by referring to a plurality of data flows having undergone a processing arrangement.

Figure 20:
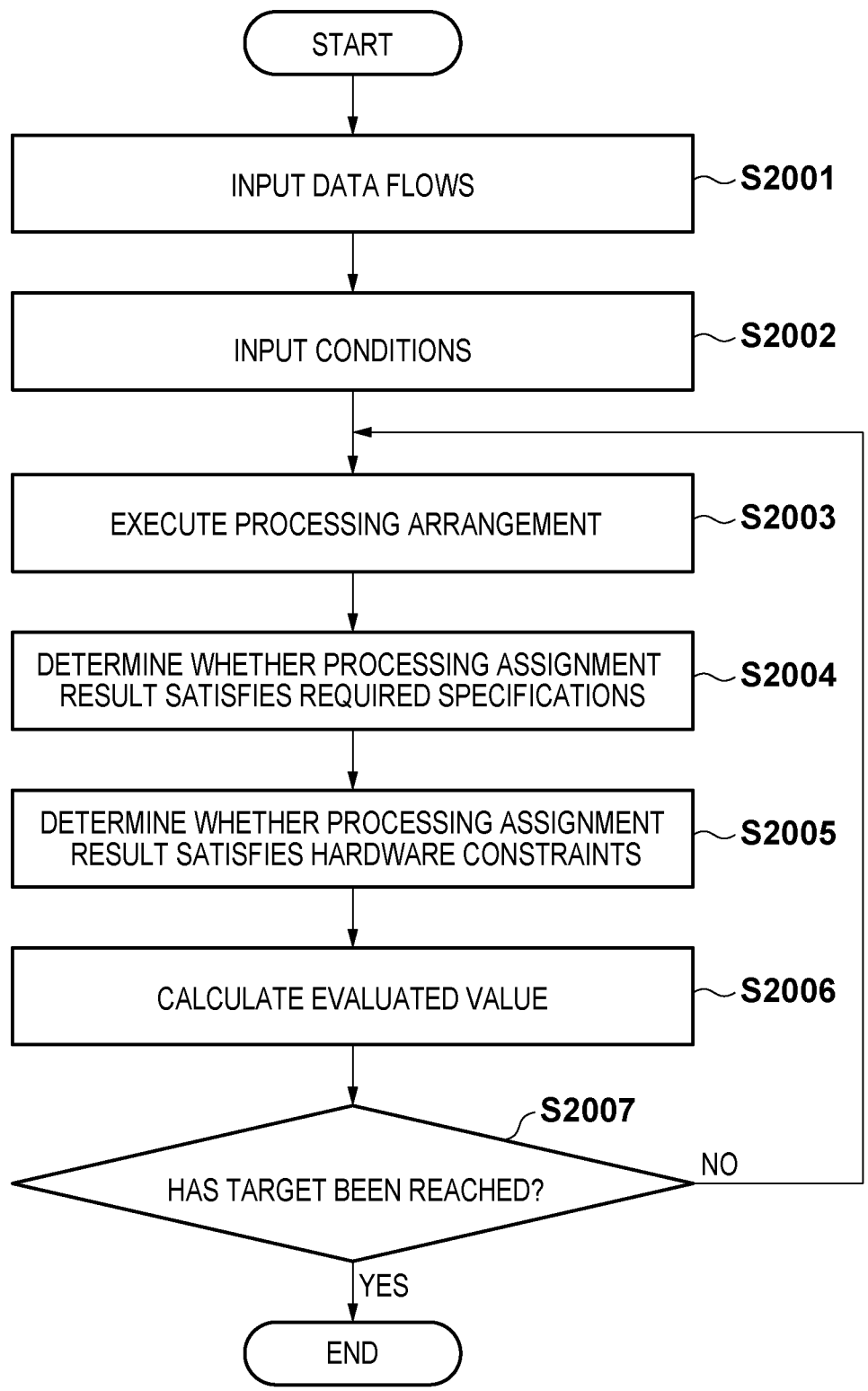
FIG. 20 is a flowchart illustrating a procedure of executing a processing arrangement according to the fifth embodiment.

A processing arrangement in step S2003 of FIG. 20 is executed only for the data flow B. The data flows A and C have undergone a processing arrangement and the processing arrangements are not changed. With respect to processing in step S2006 of FIG. 20, there is the following difference as compared with the fifth embodiment.

If a setting value $u_{i0,j,k}$ in a data flow i0 having undergone a processing arrangement is not equal to a setting value $u_{i1,j,k}$ of a processing element arranged at the same position in a data flow i1 as a processing arrangement target, $\alpha_3$ is added to the setting change count. If the setting value $u_{i1,j,k}$ in the data flow i1 as a processing arrangement target is not equal to a setting value $u_{i2,j,k}$ of a processing element arranged at the same position in a data flow i2 having undergone a processing arrangement, $\beta_3$ is added to the setting change count. If the setting values are equal to each other, no addition operation is executed.

Note that $j0_r$ represents a node j0 of the data flow i0 arranged in a processing element r, $j1_r$ represents a node j1 of the data flow i1, and $j2_r$ represents a node j2 of the data flow i2 where r represents an index indicating each processing element, as described above.

The setting change count necessary for changing the processing contents of a node arranged at the same position when a data flow is switched is obtained by $$\text{setting change count} = s = \sum_{r,k} \begin{cases} \alpha_3 & \text{if } (u_{i0,j0_r,k} \neq u_{i2,j1_r,k}) \\ 0 & \text{otherwise} \end{cases} + \quad (13)$$

$$\sum_{r,k} \begin{cases} \beta_3 & \text{if } (u_{i,j1_r,k1} \neq u_{i2,j2_r,k}) \\ 0 & \text{otherwise} \end{cases}$$

where $\alpha_3$ and $\beta_3$ are generally 1. It is, however, possible to change the weights for each address at which a setting is stored depending on the structure of the configuration memory of a processing element. It is also possible to assign the weights for each data flow to assign priority to the switching time for each data flow.

With respect to a distance, there is the following difference. In the example shown in FIG. 22, the distance is represented as the total of distances 2218, 2219, 2220, 2221, 2227, 2228, 2229, 2230, 2236, 2237, and 2238. The arrangements of the processing elements in FIG. 22 are merely examples, and the total distance changes by changing the arrangements. After the arrangement operation, it is possible to represent the distance based on the arrangement and the data input/output of a data flow using $$\text{distance} = d = \sum_{l} \left( \kappa 3_1 \cdot |x_{i1,s_{i1,1}} - x_{i1,d_{i1,1}}| + \lambda 3_1 \cdot |y_{i1,s_{i1,1}} - y_{i1,d_{i1,1}}| \right) \quad (14)$$

where $\kappa 3_1$ and $\lambda 3_1$ represent weights which can be made constant or can be individually changed depending on architecture such as the distance between nodes of each data flow. When newly inserting a data flow, it is possible to obtain the effect of decreasing the setting change count with respect to data flows before and after insertion.

Eighth Embodiment

Figure 23:
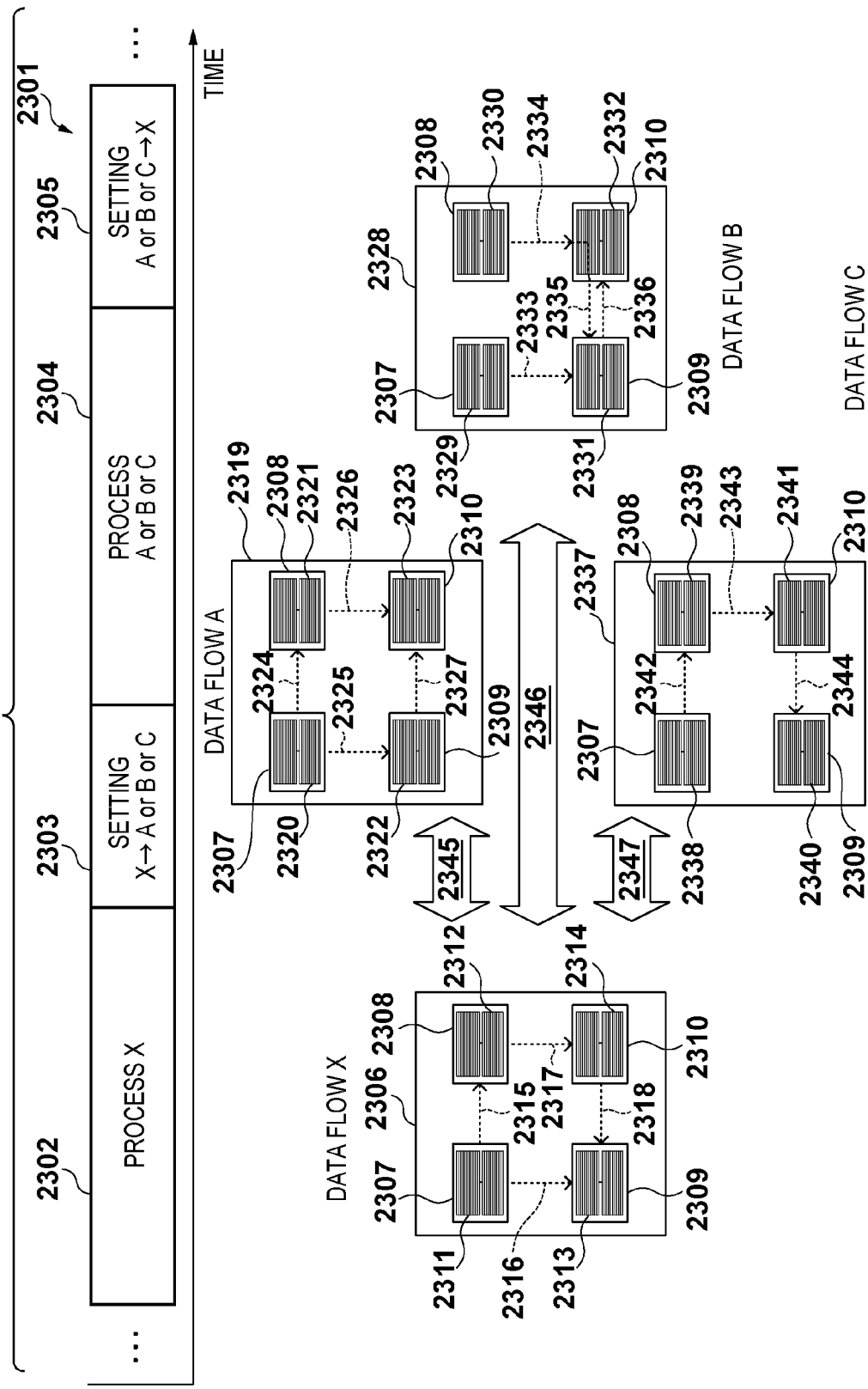
FIG. 23 is a view showing an overview for executing the processing arrangement of data flows according to the eighth embodiment.

The eighth embodiment of the present invention will be described. FIG. 23 shows a time chart of processes and an overview of a processing arrangement according to the eighth embodiment. The eighth embodiment relates to a processing arrangement when, after processing of a data flow as a reference, a data flow to be executed next changes depending on a processing result.

In a time chart 2301 shown in FIG. 23, processing of a data flow X as a reference is executed during a period 2302, and a setting change is made from the data flow X to a data flow A, B, or C depending on a processing result during a period 2303. After the setting operation is completed, the processing of the data flow A, B, or C is executed during a period 2304, and a setting change is made from the data flow A, B, or C to the data flow X during a period 2305 for re-executing the processing of the data flow X as a reference. Although the above sequence is repeated, which one of the data flows A, B, and C is to be executed is determined depending on the result of the data flow X.

In FIG. 23, reference numerals 2306, 2319, 2328, and 2337 denote arrangements of the data flows X, A, B, and C, respectively. In this embodiment, a processing assignment is executed for all the data flows X, A, B, and C. Note that processing elements 2307, 2308, 2309, and 2310 in the arrangement 2306, 2319, 2328, or 2337 indicate identical processing elements.

Settings 2311, 2312, 2313, and 2314 indicate the settings of the processing elements 2307, 2308, 2309, and 2310 in the arrangement of the data flow X, respectively. Settings 2320, 2321, 2322, and 2323 indicate the settings of the processing elements 2307, 2308, 2309, and 2310 in the arrangement of the data flow A, respectively. Settings 2329, 2330, 2331, and 2332 indicate the settings of the processing elements 2307, 2308, 2309, and 2310 in the arrangement of the data flow B, respectively. Settings 2338, 2339, 2340, and 2341 indicate the settings of the processing elements 2307, 2308, 2309, and 2310 in the arrangement of the data flow C, respectively. The settings correspond to those described in FIG. 6 as in the first embodiment.

More specifically, in the eighth embodiment, a processing arrangement is executed for the data flows X, A, B, and C. To execute a processing arrangement, a total setting change count, in the processing elements 2307, 2308, 2309, and 2310, necessary for data flow changes between the data flows X and A, X and B, and X and C, and the total distance of the connections between the processing elements are focused.

Note that reference numeral 2345 denotes a setting change for the processing elements 2307, 2308, 2309, and 2310 between the data flows X and A; and 2346, a setting change for the processing elements 2307, 2308, 2309, and 2310 between the data flows X and B.

Reference numeral 2347 denotes a setting change for the processing elements 2307, 2308, 2309, and 2310 between the data flows X and C.

The eighth embodiment is different from the fifth embodiment in that there is a branch in the processing sequence, and a processing arrangement is executed for data flows between branch destinations and a branch source.

In step S2001 of FIG. 20, while a plurality of data flows are input, a processing sequence including a partially arbitrary sequence relation is input. Note that "partially arbitrary" means in this embodiment that there is a branch in an execution order and only an execution order of a branch source and branch destinations is arbitrary.

A processing arrangement in step S2003 of FIG. 20 is executed for all the data flows X, A, B, and C as processing arrangement targets. Although a case in which all the data flows are considered as processing arrangement targets is shown in this embodiment, the present invention is not limited to this. This embodiment focuses on a processing sequence. If at least one data flow has already undergone a processing arrangement, a processing arrangement is executed for other data flows.

With respect to processing in step S2006 of FIG. 20, there is the following difference as compared with the fifth embodiment. If a setting value $u_{i0,j,k}$ in a data flow i0 as a processing arrangement target is not equal to the same type of setting value $u_{i1,j,k}$ of a processing element arranged at the same position in a data flow i1 as a processing arrangement target, $\alpha_4$ is added to a setting change count. If the setting value $u_{i0,j,k}$ in the data flow i0 as a processing arrangement target is not equal to the same type of setting value $u_{i2,j,k}$ of a processing element arranged at the same position in a data flow i2 as a processing arrangement target, $\beta_4$ is added to the setting change count. Furthermore, if the setting value $u_{i0,j,k}$ in the data flow i0 as a processing arrangement target is not equal to the same type of setting value $u_{i3,j,k}$ of a processing element arranged at the same position in a data flow i3 as a processing arrangement target, $\gamma_4$ is added to the setting change count. Alternatively, if the setting values are equal to each other, no addition operation is executed.

Note that $j0_r$ represents a node j0 of the data flow i0 arranged in a processing element r, $j1_r$ represents a node j1 of the data flow i1, $j2_r$ represents a node j2 of the data flow i2, and j3$_r$ represents a node j3 of the data flow i3 where r represents an index indicating each processing element, as described above.

The setting change count necessary for changing the processing contents of a node arranged at the same position when a data flow is switched is obtained by $$\text{setting change count} = s = \sum_{r,k} \begin{cases} \alpha_4 & \text{if } (u_{i0,j0_r,k} \neq u_{i1,j1_r,k}) \\ 0 & \text{otherwise} \end{cases} + \qquad (15)$$

$$\sum_{r,k} \begin{cases} \beta_4 & \text{if } (u_{i0,j0_r,k} \neq u_{i2,j2_r,k}) \\ 0 & \text{otherwise} \end{cases} +$$

$$\sum_{r,k} \begin{cases} \gamma_4 & \text{if } (u_{i0,j0_r,k} \neq u_{i3,j3_r,k}) \\ 0 & \text{otherwise} \end{cases}$$

where $\alpha_4$, $\beta_4$, and $\gamma_4$ are generally 1. It is, however, possible to change the weights for each address at which a setting is stored depending on the structure of the configuration memory of the processing element. It is also possible to assign the weights for each data flow to assign priority to the switching time for each data flow.

With respect to a distance, there is the following difference. In the example shown in FIG. 23, the distance is represented as the total of distances 2315, 2316, 2317, 2318, 2324, 2325, 2326, 2327, 2333, 2334, 2335, 2336, 2342, 2343 and 2344. The arrangements of the processing elements in FIG. 23 are merely examples, and the total distance changes by changing the arrangements. After the arrangement operation, it is possible to represent the distance based on the arrangement and the data input/output of a data flow using $$\text{distance} = d = \sum_{i,l} \left( \kappa 4_{i,l} \cdot |x_{i,s_{i,l}} - x_{i,d_{i,l}}| + \lambda 4_{i,l} \cdot |y_{i,s_{i,l}} - y_{i,d_{i,l}}| \right) \qquad (16)$$

where $\kappa 4_{i,1}$ and $\lambda 4_{i,1}$ represent weights which can be made constant or can be individually changed depending on architecture such as the distance between nodes of each data flow. According to this embodiment, even if there is a branch in an execution order when sequentially executing a plurality of data flows, it is possible to obtain the effect of decreasing the setting change count by considering a data flow as a branch source and a plurality of other data flows as branch destinations.

Ninth Embodiment

Figure 24:
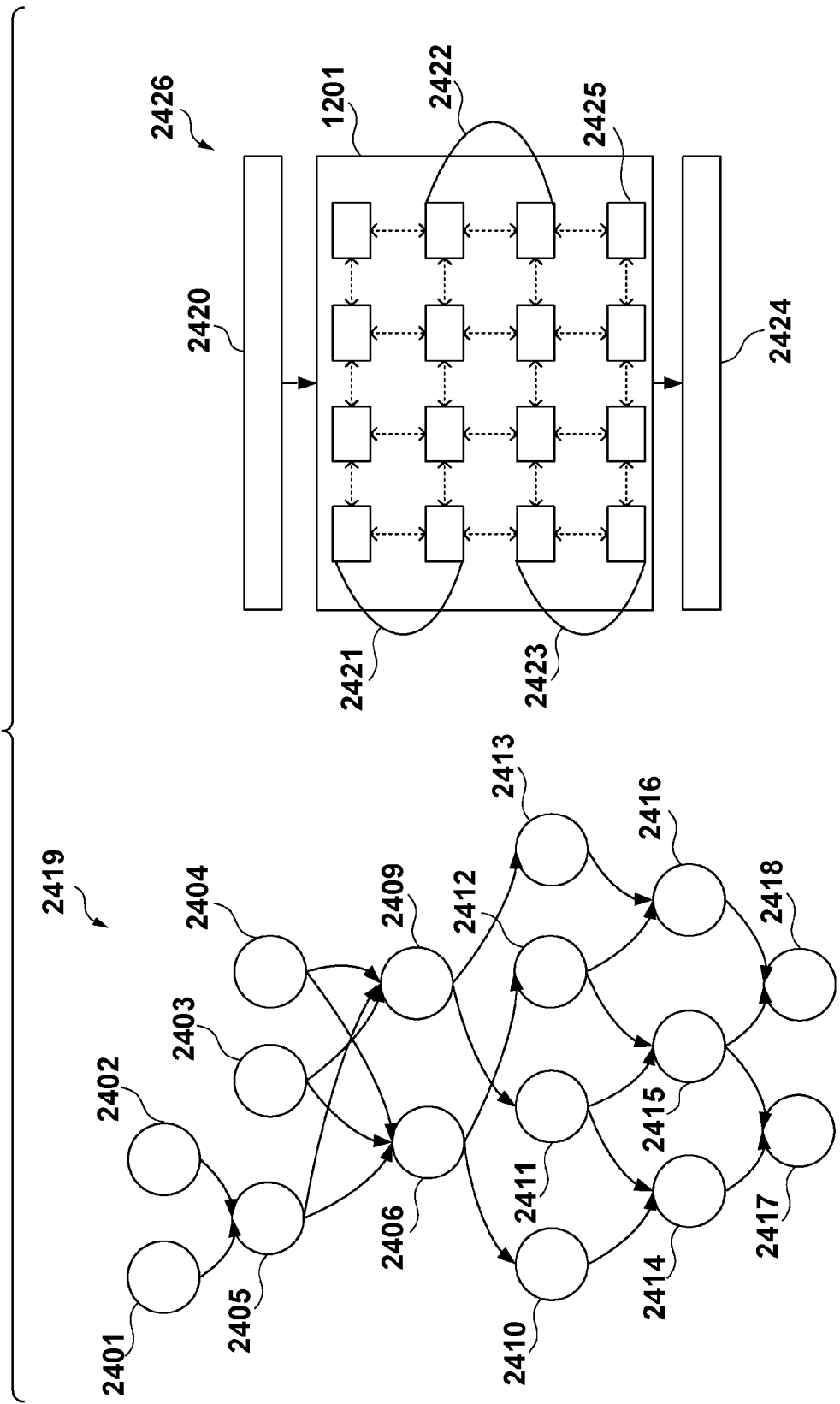
FIG. 24 is a view showing an overview for limiting the processing arrangeable range of a data flow according to the ninth embodiment.

The ninth embodiment of the present invention will be described. FIG. 24 shows a data flow and a method of limiting a processing arrangement according to the ninth embodiment. In many cases, a processing arrangement problem is generally complicated and it takes long time to calculate a solution. When simultaneously arranging a plurality of data flows as in the present invention, the problem becomes large. In the ninth embodiment, therefore, a solution calculation time is effectively shortened by limiting a processing arrangeable range.

A data flow 2419 includes nodes 2401 to 2418 corresponding to a plurality of processes. Reference numeral 2420 denotes an input device for a processing element array 2426; and 2424, an output device. There exists the processing element array 2426 between the input and output devices.

In the ninth embodiment, when arranging the processes of the data flow 2419 in an arrangement model 1801, the solution space is efficiently decreased by associating the input/output positions of the processing element array with the depth direction of the data flow. More specifically, the nodes 2401 to 2404 are set to be arrangeable only in a range denoted by reference numeral 2421. The nodes 2405 to 2410 are set to be arrangeable only in a range denoted by reference numeral 2422. The nodes 2411 to 2414 are set to be arrangeable in the range 2422. The nodes 2415 to 2418 are set to be arrangeable only in a range denoted by reference numeral 2423.

The limitations are assumed to be input in step S2002 of FIG. 20. Although an arrangeable range is associated with the depth of the data flow and the input/output directions of the processing element array in the ninth embodiment, the present invention is not limited to this.

Although a processing arrangement method has been described for each use case in the above-described embodiments, a combination of the methods may be used in the present invention. Furthermore, although a processing element has been described as a structure element of a reconfigurable device, the present invention is not limited to this and an LUT or a combination of an LUT and a processing element may be used. Settings are not limited to those described in the embodiments, and settings used in an LUT-based reconfigurable device may be available. Although all input data flows are considered as processing arrangement targets in the embodiments, a processing arrangement may be executed for only some of the data flows by specifying the processing arrangement target range of the data flows. Furthermore, although the number of processing elements is always the same for data flows in the embodiments, the number of processing elements in which processes are arranged may be different. Although an arrangement is determined so that the total distance becomes small in the embodiments, an arrangement may be determined so that the maximum value of each distance becomes small. Alternatively, an arrangement may be determined so that the average of distances becomes small.

In the above-described embodiments, assume that processing elements are uniformly arranged in a grid pattern and the connection distance between processing elements is constant. The present invention, however, is not limited to this. If processing elements are connected to have a tree structure, each distance may be given a weight according to the tree structure. That is, each distance may be given a weight according to the connection configuration of processing elements.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2011-025284 filed Feb. 8, 2011, No. 2011-031220 filed Feb. 16, 2011, No. 2011-120990 filed May 30, 2011, No. 2012-003035 filed Jan. 11, 2012, and No. 2012-003497 filed Jan. 11, 2012, which are hereby incorporated by reference herein in their entirety.

What is claimed is:

1. A processing assignment method of assigning a process to a structure element for a reconfigurable device including a plurality of structure elements, the method comprising:
   a data flow input step of inputting at least two different data flows including a first data flow and a second data flow that is different from the first data flow, setting information for implementing the first data flow by the plurality of structure elements, configuration information of said plurality of structure elements, and an execution order of the data flows, specifying an order in which the data flows are to be executed for a subject processing, where each of the data flows represents each of one or more processes to be executed by each of the plurality of structure elements;
   a constraint step of inputting a constraint of the structure element; and
   a processing assignment determination step of determining a processing assignment using a predetermined algorithm so that, based on the constraint of the structure element and the execution order of the data flows, a setting change count indicating a total number of changes of setting for reconstructing the plurality of structure elements when switching from the first data flow to the second data flow becomes small,
   wherein said processing assignment determination step includes
      a candidate determination step of determining, based on the execution order, assignment candidates for assigning processes to the structure elements for the first and second data flows,
      a change count calculation step of calculating an assignment change count for each assignment candidate based on the setting information and the configuration information, and
      a determination step of determining a processing assignment to the structure elements so that the change count becomes small, and
   wherein said determination step includes:
      a discrimination step of discriminating based on the configuration information whether the assignment candidate is assignable to the structure element,
      a penalty value determination step of determining a penalty value when said discrimination step discriminates that the assignment candidate is not assignable,
      an evaluated value calculation step of calculating an evaluated value for determining an assignment based on the change count and the penalty value, and
      an evaluated value discrimination step of discriminating whether the evaluated value is not larger than a threshold,
   wherein when it is discriminated that the evaluated value is not larger than the threshold, said determination step includes determining the assignment candidate as a processing assignment to the structure element, and
   wherein at least one of said steps is performed by a computer.

2. The method according to claim 1, wherein at least one of the input data flows has undergone a processing assignment, and a processing assignment is executed for a data flow, which has not undergone a processing assignment, by referring to the data flow which has undergone the processing assignment.

3. The method according to claim 1, wherein a processing assignment is collectively executed for a plurality of data flows, which have not undergone a processing assignment, of the input data flows.

4. The method according to claim 1, wherein the setting change count is weighted for each data flow or settings for determining processing contents of the structure element.

5. A non-transitory computer-readable storage medium storing a program for causing a computer to execute each step of a processing assignment method according to claim 1.

6. An information processing apparatus including a plurality of structure elements to which processes for implementing a data flow are assignable, where the data flow represents each of one or more processes to be executed by each of the plurality of structure elements and an execution order indicating an order in which the processes are to be executed by the plurality of structure elements for a subject processing, the apparatus comprising:
   at least one CPU and memory, said at least one CPU and memory cooperating to function as:
   an input unit which inputs setting information for implementing a plurality of data flows including a first data flow and a second data flow by said plurality of structure elements, an execution order of the plurality of data flows, and configuration information of said plurality of structure elements; and
   a controller which assigns processes for implementing the first data flow to said plurality of structure elements using a predetermined algorithm based on the setting information and the configuration information so that the number of structure elements to be changed for settings for implementing a second data flow becomes small,
   wherein said controller comprises
      a candidate determination unit which determines, based on the execution order, assignment candidates for assigning processes to the structure elements for the plurality of data flows,
      a change count calculation unit which calculates an assignment change count for each assignment candidate based on the setting information and the configuration information, and
      a determination unit which determines a processing assignment to the structure elements so that the change count becomes small, and
   wherein said determination unit comprises
      a discrimination unit which discriminates based on the configuration information whether the assignment candidate is assignable to the structure element,
      a penalty value determination unit which determines a penalty value when said discrimination unit discriminates that the assignment candidate is not assignable,
      an evaluated value calculation unit which calculates an evaluated value for determining an assignment based on the change count and the penalty value, and
      an evaluated value discrimination unit which discriminates whether the evaluated value is not larger than a threshold, and
   wherein when it is discriminated that the evaluated value is not larger than the threshold, said determination unit determines the assignment candidate as a processing assignment to the structure element.

7. The apparatus according to claim 6, wherein, when at least one of the plurality of data flows has undergone a processing assignment to the structure elements, said change count calculation unit refers to the assignment, and calculates, for each assignment candidate, a processing assignment change count for a data flow to be executed next, processes of which have not been assigned to the structure elements.

8. The apparatus according to claim 6, wherein said change count calculation unit collectively calculates, for each assignment candidate, a processing assignment change count for a data flow, processes of which have not been assigned to the structure elements.

9. The apparatus according to claim 6, wherein said input unit further inputs an insertion destination position of the execution order for a data flow, processes of which have not been assigned to the structure elements, and said change count calculation unit refers to processing assignments of data flows having undergone a processing assignment, which are processed before and after processing of the data flow to be inserted, and calculates, for each assignment candidate, a change count of a processing assignment to the structure elements for a data flow, processes of which have not assigned to the structure elements.

10. The apparatus according to claim 6, wherein said change count calculation unit calculates the change count by giving a weight for each data flow or each process of the structure element.

11. A control method for an information processing apparatus comprising an input unit, a controller, and a plurality of structure elements to which processes for implementing a data flow are assignable, where the data flow represents each of one or more processes to be executed by each of the plurality of structure elements and an execution order indicating an order of execution by the plurality of structure elements for a subject processing, the method comprising:

an input step of inputting setting information for implementing the plurality of structure elements including a first data flow and a second data flow by the plurality of structure elements, an execution order of the plurality of data flows, and configuration information of the plurality of structure elements; and a control step of assigning processes for implementing the first data flow to the plurality of structure elements using a predetermined algorithm based on the setting information and the configuration information so that the number of structure elements to be changed for settings for implementing the second data flow becomes small, wherein said control step comprises a candidate determination step of determining, based on the execution order, assignment candidates for assigning processes to the structure elements for the first and second data flows, a change count calculation step of calculating an assignment change count for each assignment candidate based on the setting information and the configuration information, and a determination step of determining a processing assignment to the structure elements so that the change count becomes small, and wherein said determination step comprises a discrimination step of discriminating based on the configuration information whether the assignment candidate is assignable to the structure element, a penalty value determination step of determining a penalty value when said discrimination step discriminates that the assignment candidate is not assignable, an evaluated value calculation step of calculating an evaluated value for determining an assignment based on the change count and the penalty value, and an evaluated value discrimination step of discriminating whether the evaluated value is not larger than a threshold, wherein when it is discriminated that the evaluated value is not larger than the threshold, said determination step includes determining the assignment candidate as a processing assignment to the structure element, and wherein at least one of said steps is performed by a computer.

12. A non-transitory computer-readable storage medium storing a program for causing a computer to execute each step of a control method for an information processing apparatus according to claim 11.

* * * * *